(12) United States Patent
Ogawa

(10) Patent No.: US 11,272,093 B2
(45) Date of Patent: Mar. 8, 2022

(54) IMAGE CAPTURE CONTROL APPARATUS, DISPLAY CONTROL APPARATUS, AND CONTROL METHOD THEREFOR TO TRACK A TARGET AND TO DETERMINE AN AUTOFOCUS POSITION

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/213,550

(22) Filed: Mar. 26, 2021

(65) Prior Publication Data

US 2021/0218903 A1    Jul. 15, 2021

Related U.S. Application Data

(60) Division of application No. 16/284,314, filed on Feb. 25, 2019, now Pat. No. 10,992,853, which is a
(Continued)

(30) Foreign Application Priority Data

Aug. 31, 2016 (JP) .............................. JP2016-169621
Aug. 31, 2016 (JP) .............................. JP2016-169622
Aug. 31, 2016 (JP) .............................. JP2016-170064

(51) Int. Cl.
*H04N 5/232* (2006.01)
*G03B 13/36* (2021.01)

(52) U.S. Cl.
CPC ....... *H04N 5/232127* (2018.08); *G03B 13/36* (2013.01); *H04N 5/23216* (2013.01);
(Continued)

(58) Field of Classification Search
CPC ................. H04N 5/232941; H04N 5/232127
See application file for complete search history.

(56) References Cited

U.S. PATENT DOCUMENTS 8,934,040 B2    1/2015 Okazawa
2003/0076437 A1    4/2003 Karasaki et al.
(Continued)

FOREIGN PATENT DOCUMENTS

CN    1893561 A    1/2007
CN    101742104 A    6/2010
(Continued)

OTHER PUBLICATIONS

The above foreign documents 1-6 were cited the International Search Report of PCT/JP2017/022254 dated Sep. 19, 2017.
(Continued)

*Primary Examiner* — Gary C Vieaux
(74) *Attorney, Agent, or Firm* — Cowan, Liebowitz & Latman, P.C.

(57) ABSTRACT

An image capture control apparatus comprises a touch detector being capable of detecting a touch operation, a tracking unit that tracks a tracking target in a live view image captured by an image capturing unit, and a display control unit that, in response to the touch detector detecting a movement operation of moving a touch position, carries out control to display an indicator at a position, in a display, that is based on a movement amount of the movement operation, and a control unit configured to, in response to a predetermined amount of time elapsing after the touch for making the movement operation has been released, carry out control such that a tracking target determined on the basis of the position of the indicator is tracked by the tracking unit.

20 Claims, 30 Drawing Sheets

Related U.S. Application Data continuation of application No. PCT/JP2017/022254, filed on Jun. 16, 2017.

(52) U.S. Cl.
CPC ... *H04N 5/23218* (2018.08); *H04N 5/232941* (2018.08); *H04N 5/232945* (2018.08)

(56) References Cited

U.S. PATENT DOCUMENTS

| | | | | |
|---|---|---|---|---|
| 2007/0018069 | A1* | 1/2007 | Higashino | G03B 13/36 250/200 |
| 2011/0248942 | A1* | 10/2011 | Yana | H04N 5/232945 345/173 |
| 2012/0105660 | A1* | 5/2012 | Ogasawara | H04N 5/232945 348/E9.002 |
| 2012/0212661 | A1* | 8/2012 | Yamaguchi | G03B 13/36 348/346 |
| 2014/0293109 | A1* | 10/2014 | Kobayashi | H04N 5/232941 348/333.02 |
| 2018/0348470 | A1 | 12/2018 | Suzuki et al. | |
| 2019/0011805 | A1 | 1/2019 | Ota | |
| 2019/0116318 | A1* | 4/2019 | Ogawa | G06K 9/2081 |

FOREIGN PATENT DOCUMENTS

| | | |
|---|---|---|
| CN | 101937267 A | 1/2011 |
| CN | 102223476 A | 10/2011 |
| CN | 102457661 A | 5/2012 |
| CN | 102469267 A | 5/2012 |
| CN | 102645818 A | 8/2012 |
| CN | 103780841 A | 5/2014 |
| JP | 05-191686 A | 7/1993 |
| JP | 2008-017130 A | 1/2008 |
| JP | 2011-223476 A | 11/2011 |
| JP | 2012-089973 A | 5/2012 |
| JP | 2012-203143 A | 10/2012 |
| JP | 2014-209712 A | 11/2014 |
| WO | 2013/089190 A1 | 6/2013 |

OTHER PUBLICATIONS

The above U.S. Patent Application Publication #1 was cited in a European Search Report dated May 14, 2020 which is enclosed, that issued in the corresponding European Patent Application No. 17845835.2.

The above Foreign Patent Documents #8-10 were cited in a May 20, 2020 Chinese Office Action, which is enclosed with an English Translation, that issued in Chinese Patent Application No. 201780053511.1.

The above foreign documents were cited in a Jan. 5, 2022 Chinese Office Action, which is enclosed with an English Translation, that issued in Chinese Patent Application No. 202011470667.X The above documents were cited in a Jan. 5, 2022 Chinese Office Action, which is enclosed with an English Translation, that issued in Chinese Patent Application No. 202011474772.0.

* cited by examiner

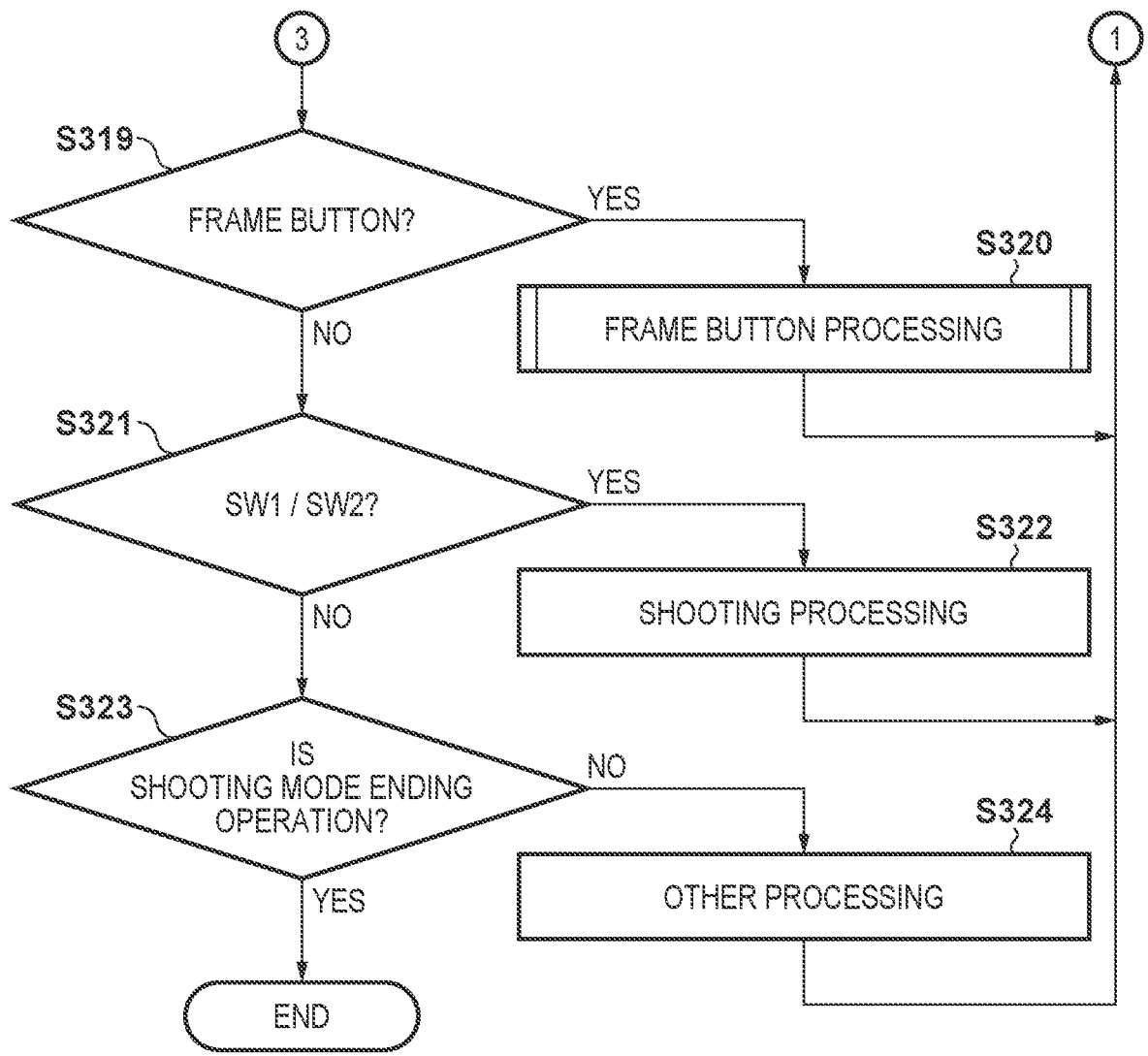

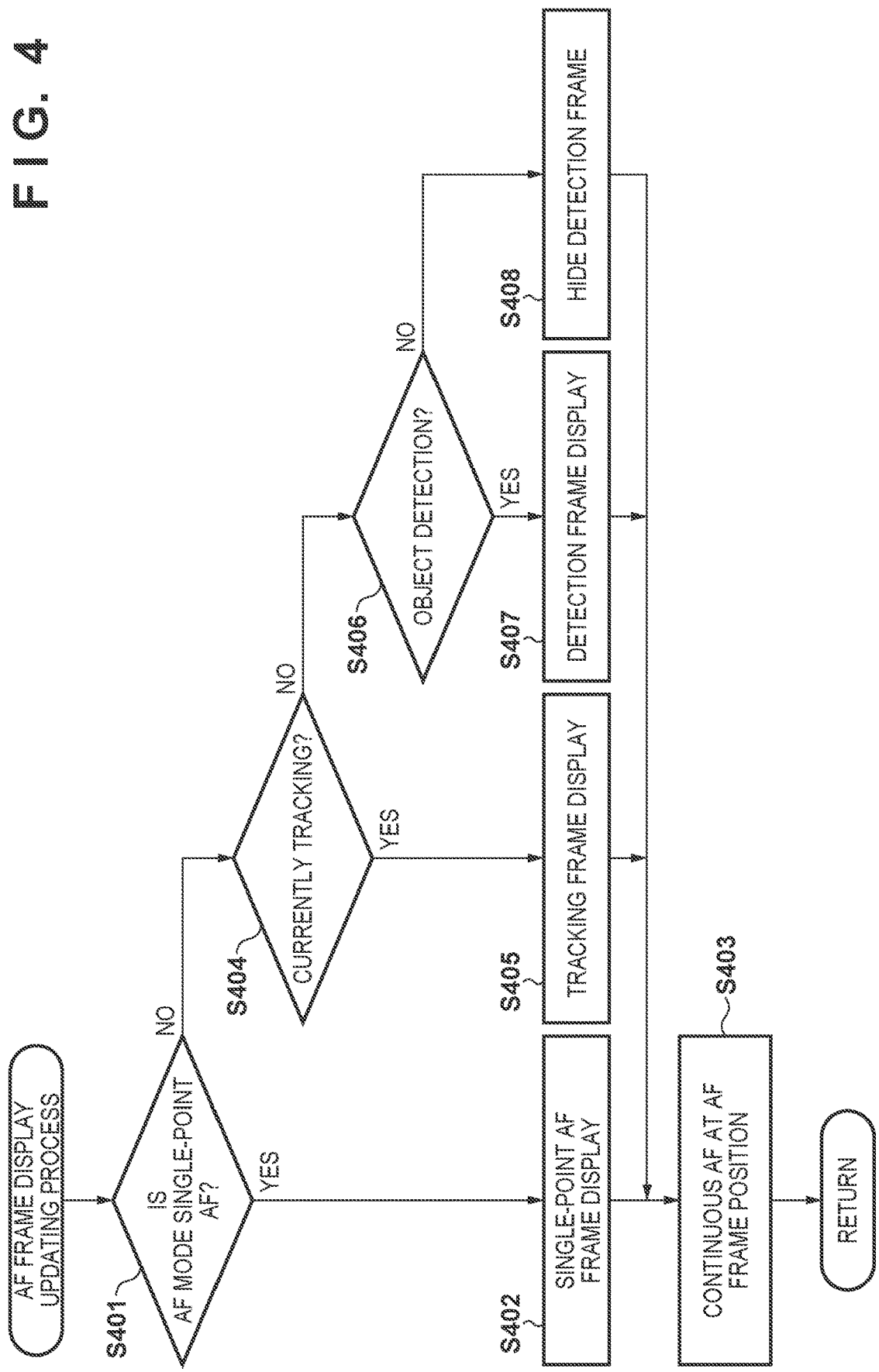

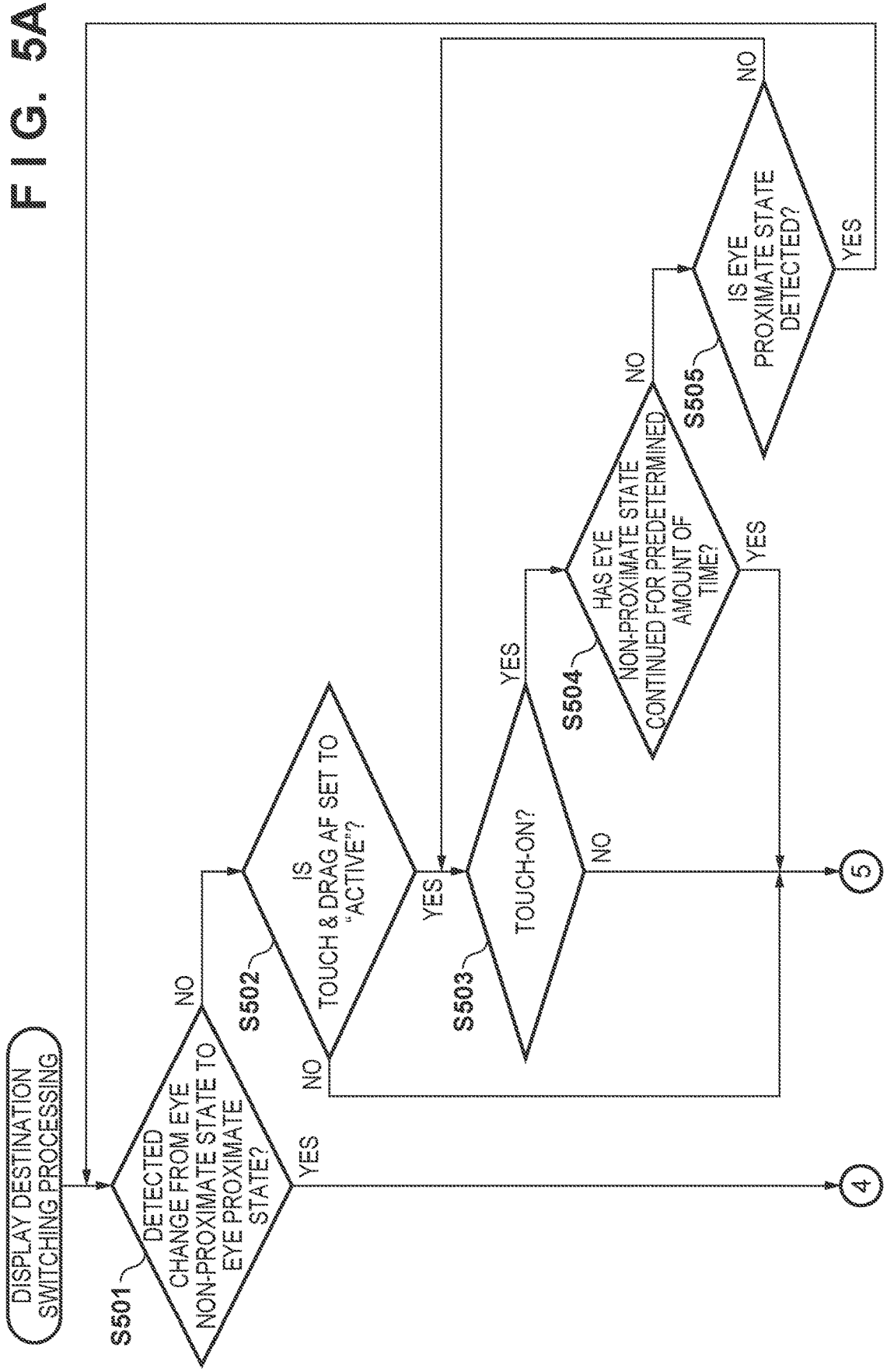

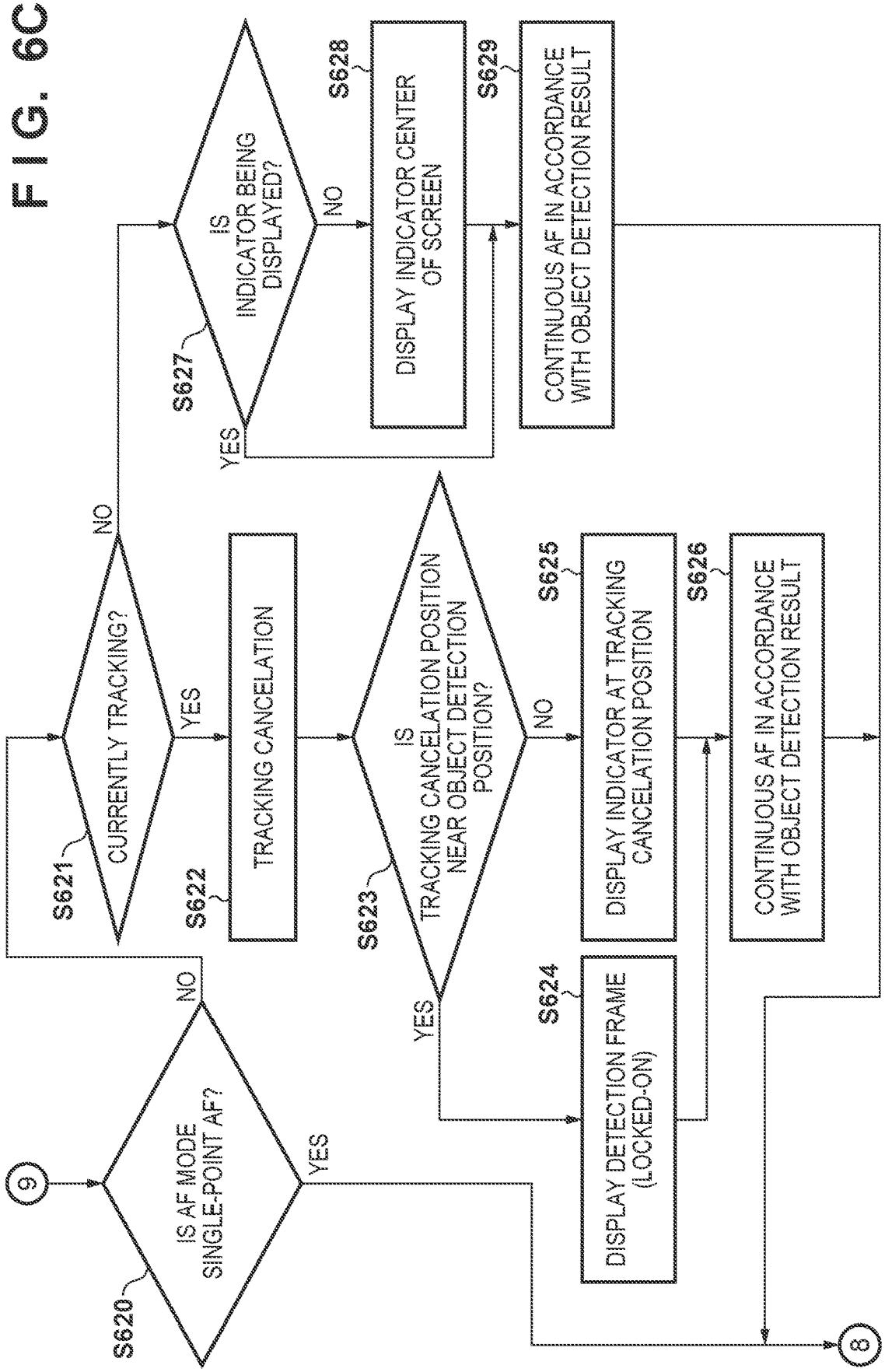

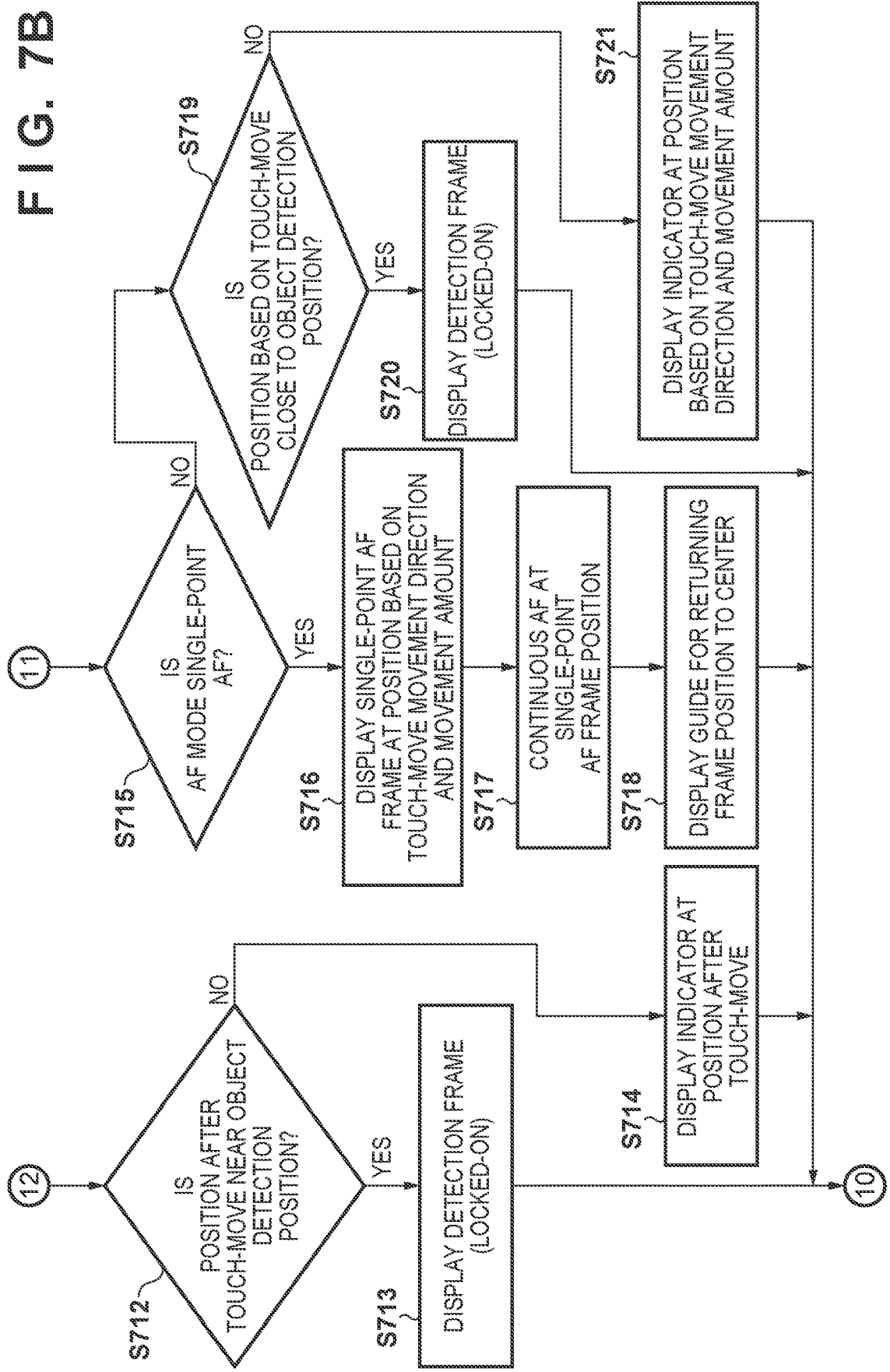

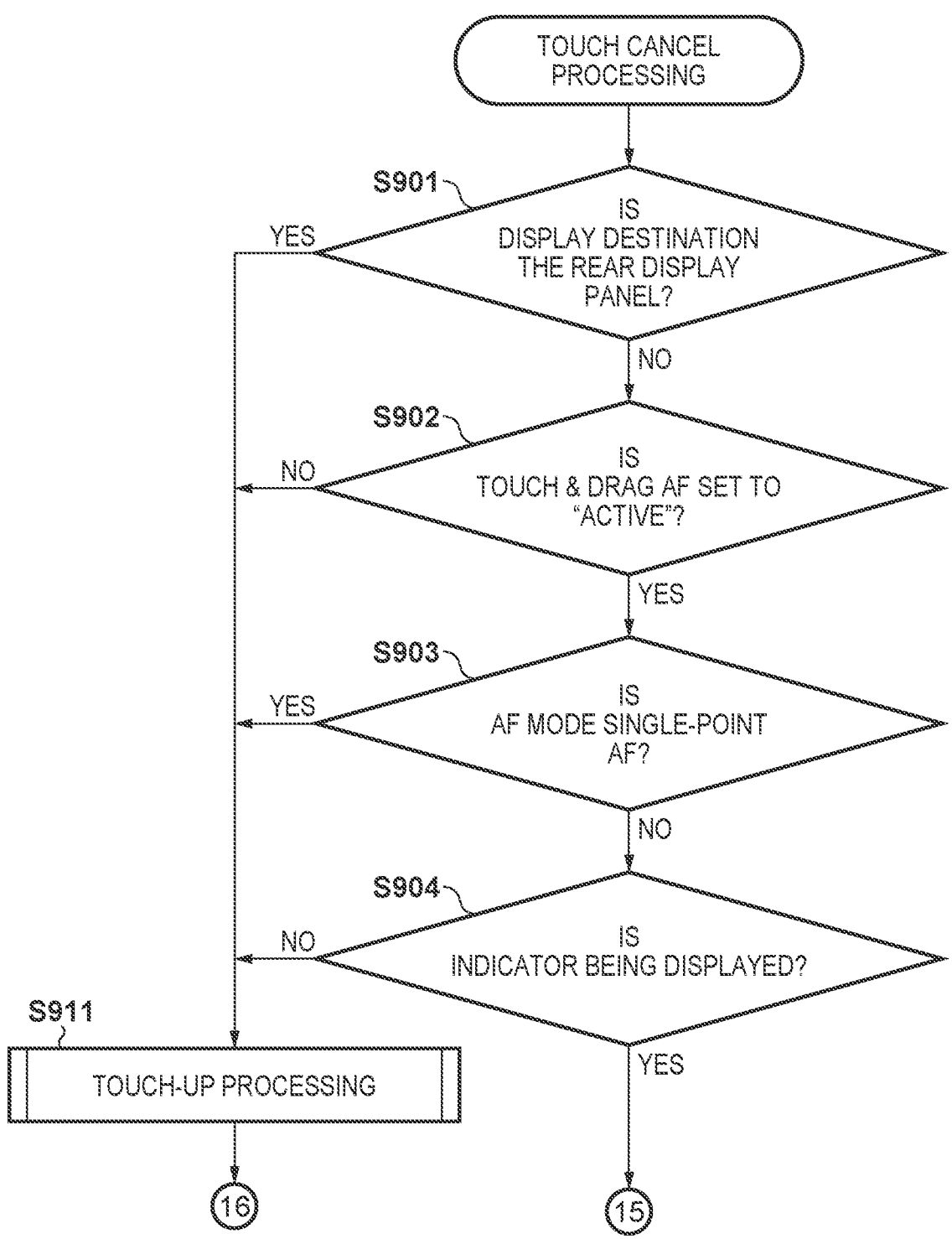

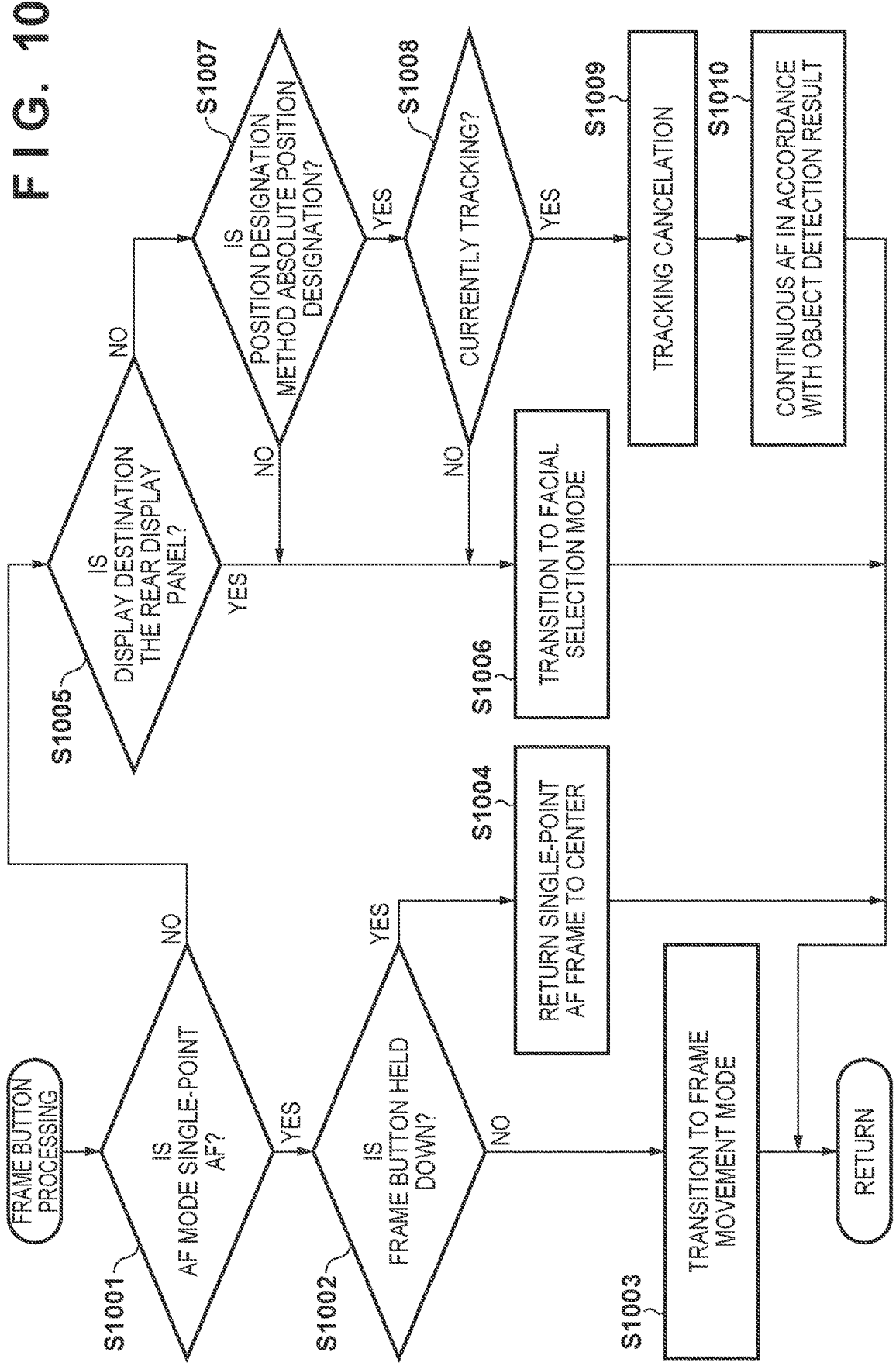

FIG. 12A

| | | | | | | |
|---|---|---|---|---|---|---|
| 1 | 2 | 3 | 4 | 5 | | SHOOT2 |
| AF OPERATION | | | | | ONE SHOT | |
| AF MODE | | | | | SINGLE-POINT AF | |
| CONTINUOUS AF | | | | | ACTIVE | |
| FOCUS MODE | | | | | AF | |
| MF PEAKING SETTING | | | | | | |
| IMAGE STABILIZATION SETTING | | | | | | |
| OPTICAL CORRECTION FOR LENS | | | | | | |

FIG. 12B

| | |
|---|---|
| TOUCH & DRAG AF SETTING | |
| TOUCH & DRAG AF | INACTIVE |
| POSITION DESIGNATION METHOD | ABSOLUTE POSITION |
| TOUCH REGION | ALL |

MENU ↩

FIG. 12C

TOUCH REGION

| |
|---|
| ALL |
| RIGHT |
| LEFT |
| UPPER-RIGHT |
| LOWER-RIGHT |
| TOP-LEFT |

SET OK

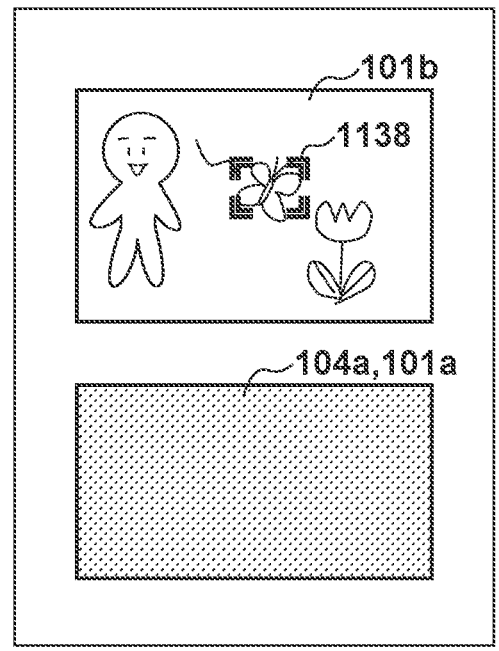
FIG. 13D1
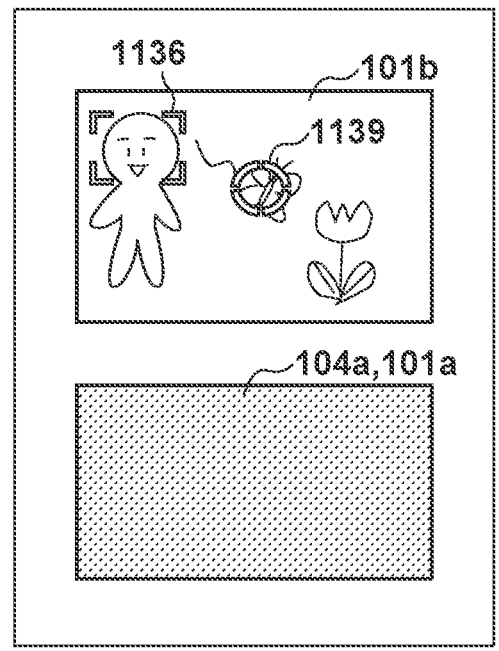
FIG. 13D2

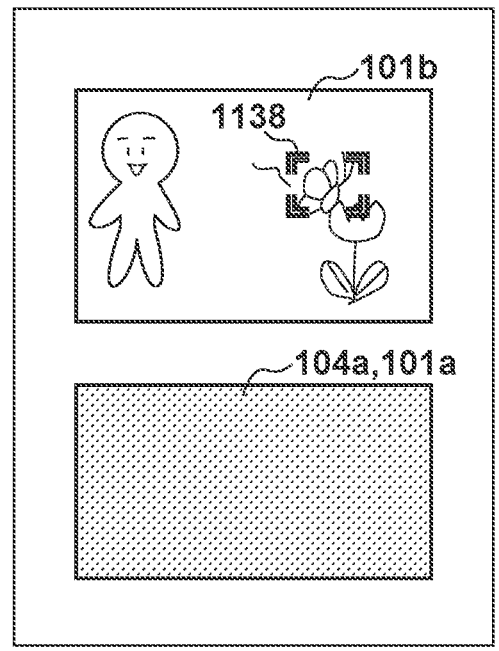
FIG. 13E1
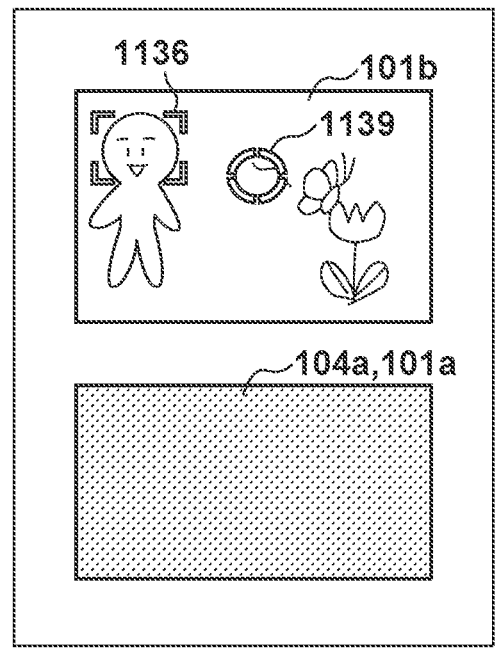
FIG. 13E2

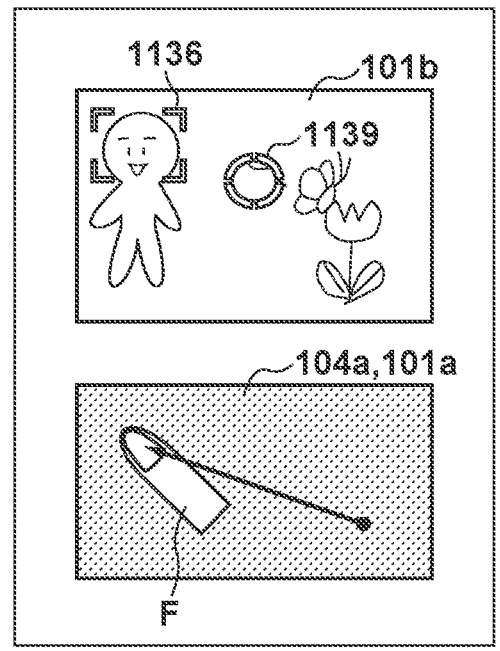
FIG. 13F1
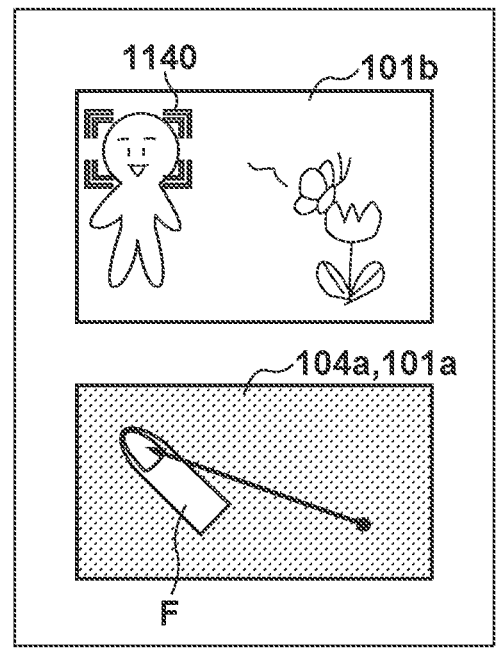
FIG. 13F2

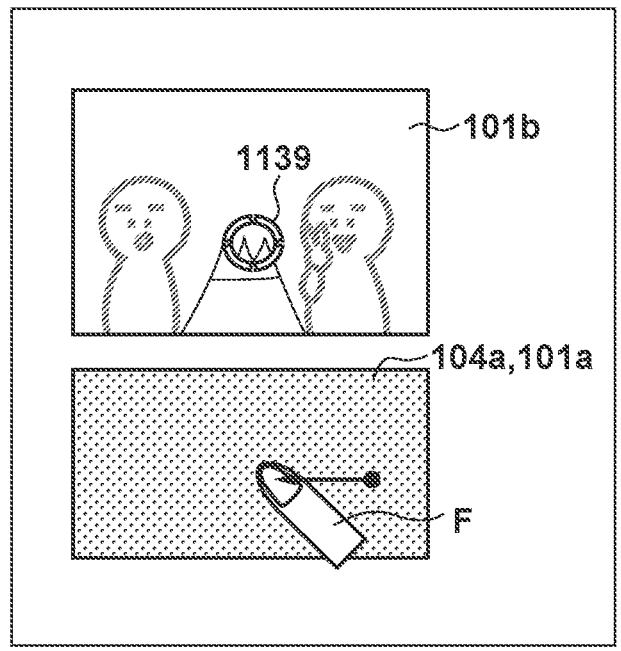
F I G. 14C1
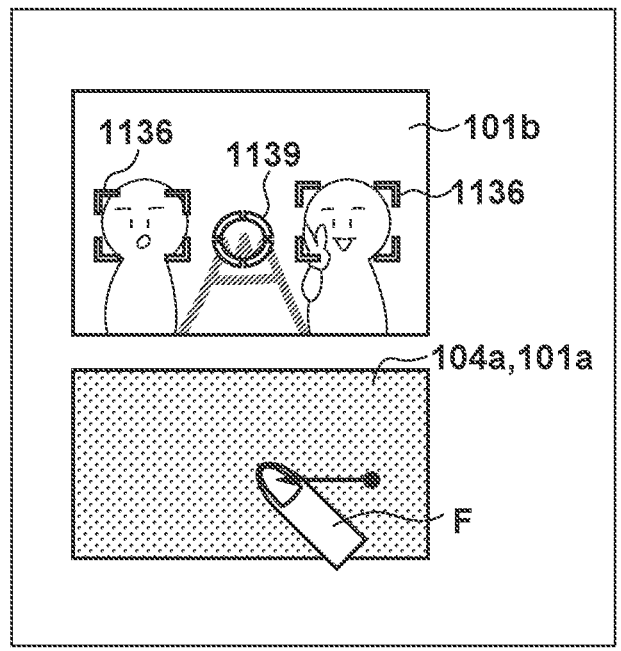
F I G. 14C2

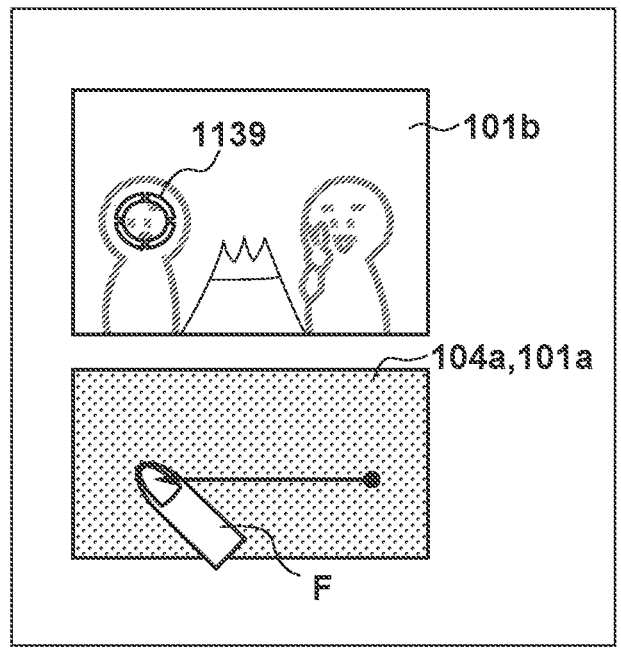
F I G. 14D1
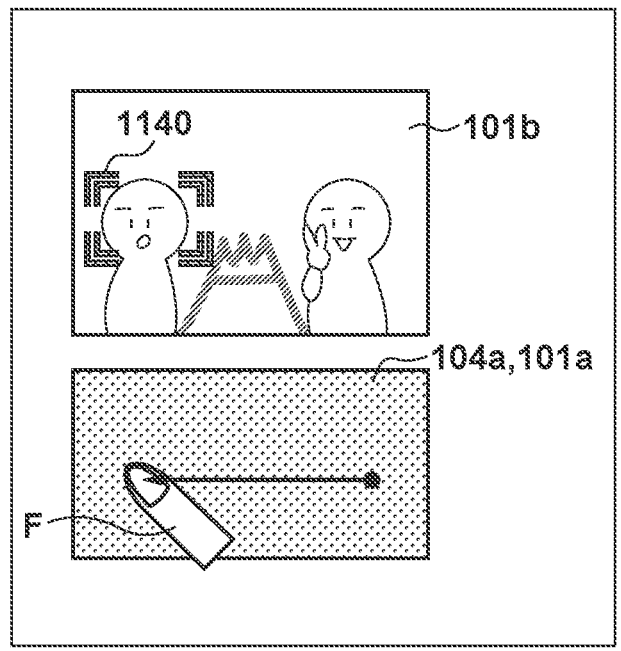
F I G. 14D2

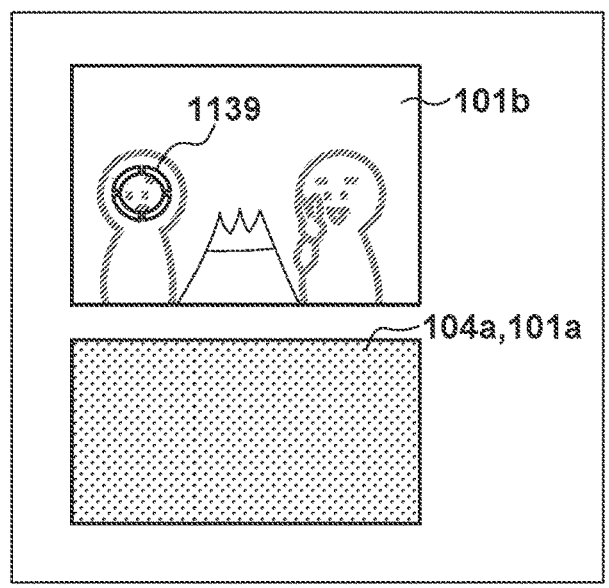
FIG. 14E1
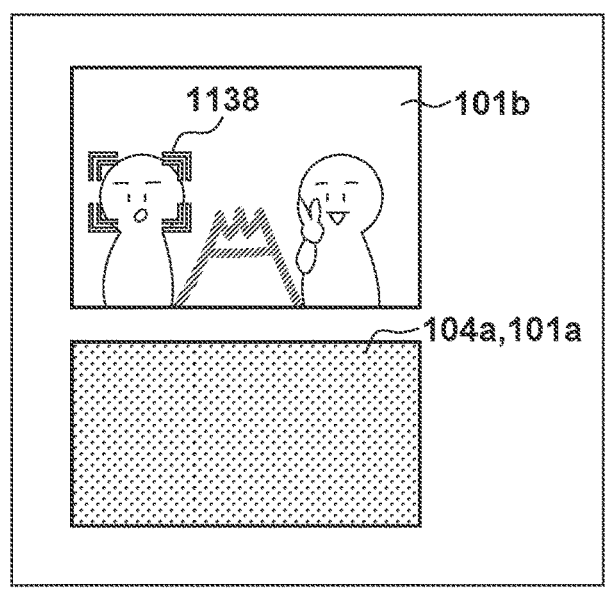
FIG. 14E2
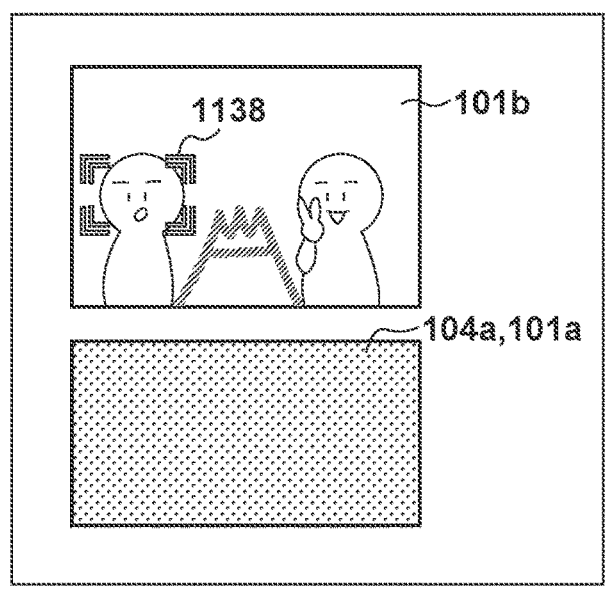
FIG. 14F

IMAGE CAPTURE CONTROL APPARATUS, DISPLAY CONTROL APPARATUS, AND CONTROL METHOD THEREFOR TO TRACK A TARGET AND TO DETERMINE AN AUTOFOCUS POSITION

CROSS-REFERENCE TO RELATED APPLICATIONS

This application is a divisional of application Ser. No. 16/284,314, filed Feb. 25, 2019, which is a Continuation of International Patent Application No. PCT/JP2017/022254, filed Jun. 16, 2017, which claims the benefit of Japanese Patent Application Nos. 2016-169621, 2016-169622 and 2016-170064 filed Aug. 31, 2016, all of which are hereby incorporated by reference herein in their entirety.

BACKGROUND OF THE INVENTION

Field of the Invention

The present invention relates to control techniques that make it possible to change focus positions through touch operations.

Background Art

Recent image capturing apparatuses such as digital cameras include apparatuses in which images can be shot while easily moving an autofocus position (AF position) by making a touch operation on a display screen. However, when shooting an image while looking through a traditional viewfinder (viewfinder-based shooting), most digital cameras allow the AF position to be designated only using physical operation means such as buttons or dials, and changing the AF position easily through touch operations has not been possible.

Against such a background, Patent Document 1 proposes a technique in which touch operations can be made on a touch panel provided separately from a viewfinder when looking through the viewfinder (touch pad operations). As methods for designating an AF position through touch operations, Patent Document 1 proposes an absolute coordinate method, in which coordinates of the touch panel and the viewfinder correspond one-to-one, and a relative coordinate method, in which the AF position is moved in accordance with the amount of movement in a touch-move (sliding) operation made on the touch panel.

On the other hand, image capturing apparatuses are known in which an electronic viewfinder (EVF) is activated when a proximity sensor such as an infrared sensor has detected that an eye is nearby, and the EVF is deactivated and a display separate from the viewfinder is switched to when the proximity sensor has detected that the eye has moved away. Patent Document 2 proposes keeping the display in a viewfinder active even if a user who is looking through the viewfinder moves his or her eye away accidentally, as long as it is for a short amount of time.

CITATION LIST

Patent Literature

PTL 1: Japanese Patent Laid-Open No. 2012-089973
PTL 2: Japanese Patent Laid-Open No. 2014-209712

However, according to Patent Document 1, in the relative coordinate method, a user sets the position of a cursor (an AF frame) as the AF position by moving the cursor indicating the AF position to a desired object and then making another touch-down operation, which means there is an increased burden in terms of the operations leading up to the AF position being set. In response to such a problem, the operational burden can be lightened by setting the object in response to a touch-up operation made after the cursor has been moved. However, with the relative coordinate method, it is conceivable that several touch-move (touch-up) operations will be made while moving the AF frame to a desired object, and starting to track an object immediately after a touch-up operation results in poor operability.

Meanwhile, if, in an object tracking mode, AF is carried out at the position of a target cursor for tracking a target midway through moving the target cursor using a touch-move (sliding) operation, an object at the position of the target cursor midway through the movement (e.g., the background) will be focused on. In this case, it is possible that the object to be tracked, which is present at a target position to which the target cursor is moved, will not be focused on, and the object to be tracked will cease being detected. With respect to this problem, Patent Document 1 does not factor in AF control carried out while moving a cursor in an EVF screen through a touch-move operation.

Furthermore, with Patent Document 1, if the user accidentally takes his or her eye away from the viewfinder midway through the touch operation, the operation format of the touch operation will change unintentionally, and the touch operation that had been carried out while looking through the viewfinder will be unintentionally terminated. Patent Document 2, meanwhile, does not factor in carrying out a touch operation when a display is active in the viewfinder while a user's eye is at the viewfinder. Setting touch operations aside, there are also situations where the user mistakenly takes his or her eye away from the viewfinder to perform some operation, which unintentionally terminates the operation the user had been carrying out while looking through the viewfinder.

Having been achieved in light of such issues, an object of the present invention is to realize a technique that reduces the burden of operations and improves the convenience when selecting a tracking target through a touch operation.

The present invention also realizes a technique that more appropriately controls AF, and thus improves the convenience, when selecting a tracking target through a touch operation.

Furthermore, the present invention realizes a technique that makes it possible to continue an operation being carried out while looking through a viewfinder, even if a user mistakenly removes his or her eye from the viewfinder midway through the operation.

SUMMARY OF THE INVENTION

To solve the aforementioned problems and achieve the object, an image capture control apparatus comprising: a touch detector configured to be capable of detecting a touch operation; and a memory and at least one processor and/or at least one circuit to perform operations of the following units: a tracking unit configured to track a tracking target in a live view image captured by an image capturing unit; a display control unit configured to, in response to the touch detector detecting a movement operation of moving a touch position, carry out control to display an indicator at a position, in a display, that is based on a movement amount of the movement operation; and a control unit configured to, in response to a predetermined amount of time elapsing after the touch for making the movement operation has been released, carry out control such that a tracking target determined on the basis of the position of the indicator is tracked by the tracking unit.

Further features of the present invention will become apparent from the following description of exemplary embodiments with reference to the attached drawings.

BRIEF DESCRIPTION OF THE DRAWINGS

The appended drawings, which are included in and constitute part of the specification, illustrate embodiments of the present invention, and along with those descriptions serve to illustrate the principles of the present invention.

FIG. 3C is a flowchart illustrating the shooting mode process.

FIG. 4 is a flowchart illustrating an AF frame display updating process.

FIG. 5A is a flowchart illustrating a display destination switching process.

FIG. 6C is a flowchart illustrating the touch-down process.

FIG. 7B is a flowchart illustrating the touch-move process.

FIG. 9A is a flowchart illustrating a touch cancel process.

FIG. 10 is a flowchart illustrating a frame button process.

FIG. 12A is a diagram illustrating an example of the display of a menu screen.

FIG. 12B is a diagram illustrating an example of the display of a menu screen.

FIG. 12C is a diagram illustrating an example of the display of a menu screen.

FIG. 13D1 is a diagram illustrating an example of a screen display provided by the touch & drag AF function.

FIG. 13D2 is a diagram illustrating an example of a screen display provided by the touch & drag AF function.

FIG. 13E1 is a diagram illustrating an example of a screen display provided by the touch & drag AF function.

FIG. 13E2 is a diagram illustrating an example of a screen display provided by the touch & drag AF function.

FIG. 13F1 is a diagram illustrating an example of a screen display provided by the touch & drag AF function.

FIG. 13F2 is a diagram illustrating an example of a screen display provided by the touch & drag AF function.

FIG. 14C1 is a diagram illustrating an example of a screen display provided by the touch & drag AF function.

FIG. 14C2 is a diagram illustrating an example of a screen display provided by the touch & drag AF function.

FIG. 14D1 is a diagram illustrating an example of a screen display provided by the touch & drag AF function.

FIG. 14D2 is a diagram illustrating an example of a screen display provided by the touch & drag AF function.

FIG. 14E1 is a diagram illustrating an example of a screen display provided by the touch & drag AF function.

FIG. 14E2 is a diagram illustrating an example of a screen display provided by the touch & drag AF function.

FIG. 14F is a diagram illustrating an example of a screen display provided by the touch & drag AF function.

DESCRIPTION OF THE EMBODIMENTS

Hereinafter, embodiments of the present invention will be described in detail with reference to the appended drawings.

Apparatus Configuration

The functions and external appearance of a digital camera according to the present embodiment will be described with reference to FIGS. 1 and 2.

Figure 1:
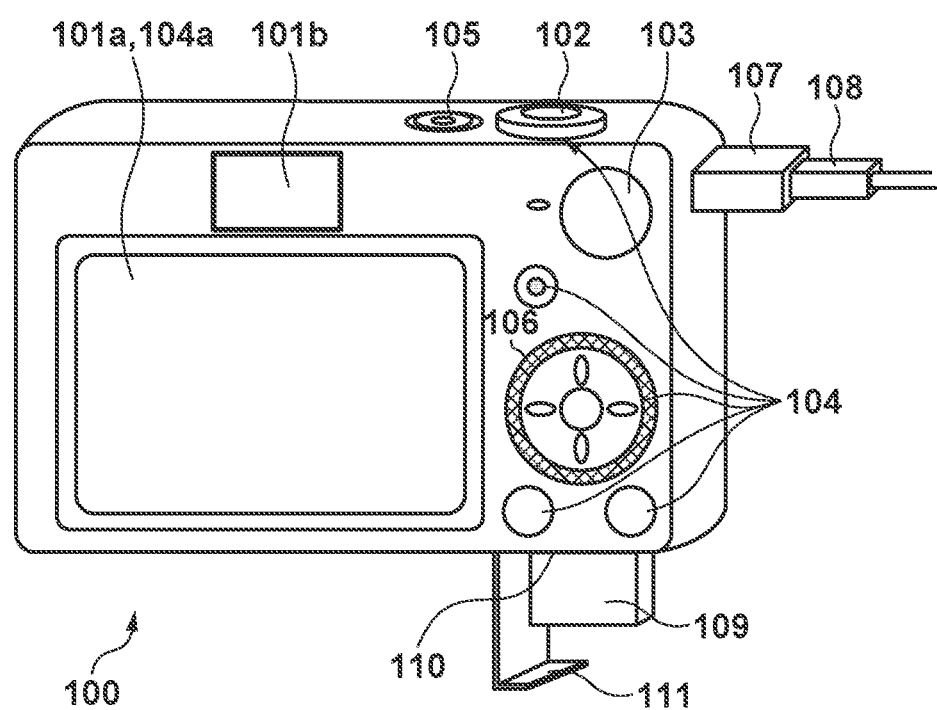
FIG. 1 is an exterior view of a rear of a digital camera.

In FIG. 1, which illustrates the external appearance of a rear of a digital camera 100 according to the present embodiment, a display unit 101 is constituted by a liquid crystal display panel (LCD) that displays images, various types of information, and the like. The display unit 101 includes a rear display panel 101a, which is a display unit arranged outside of a viewfinder, and an electronic viewfinder ("EVF" hereinafter) 101b, which is a display unit within the viewfinder. With the EVF 101b, a user can monitor (visible) an image capturing screen through an eyepiece part of a look-through type eyepiece viewfinder. A shutter button 102 is an operation member for making a shooting instruction. A mode switching button 103 is an operation member for switching among various types of modes. A connector 107 is an interface for connecting a connection cable 108 to the digital camera 100. Operation units 104 are operation units constituted by operation members such as various types of switches and buttons and a touch panel which accept various types of operations from the user. A controller wheel 106 is an electronic dial, included in the operation unit 104, that can be rotated. A power switch 105 is an operating member for switching the power on and off. A recording medium 109 is a recording medium such as a memory card, a hard disk, or the like. A recording medium slot 110 is a slot for holding the recording medium 109. The recording medium 109 held in the recording medium slot 110 can communicate with the digital camera 100. A cover 111 is a cover for the recording medium slot 110. FIG. 1 illustrates a state in which the cover 111 is open, and the recording medium 109 has been partially removed and is exposed from the recording medium slot 110.

Figure 2:
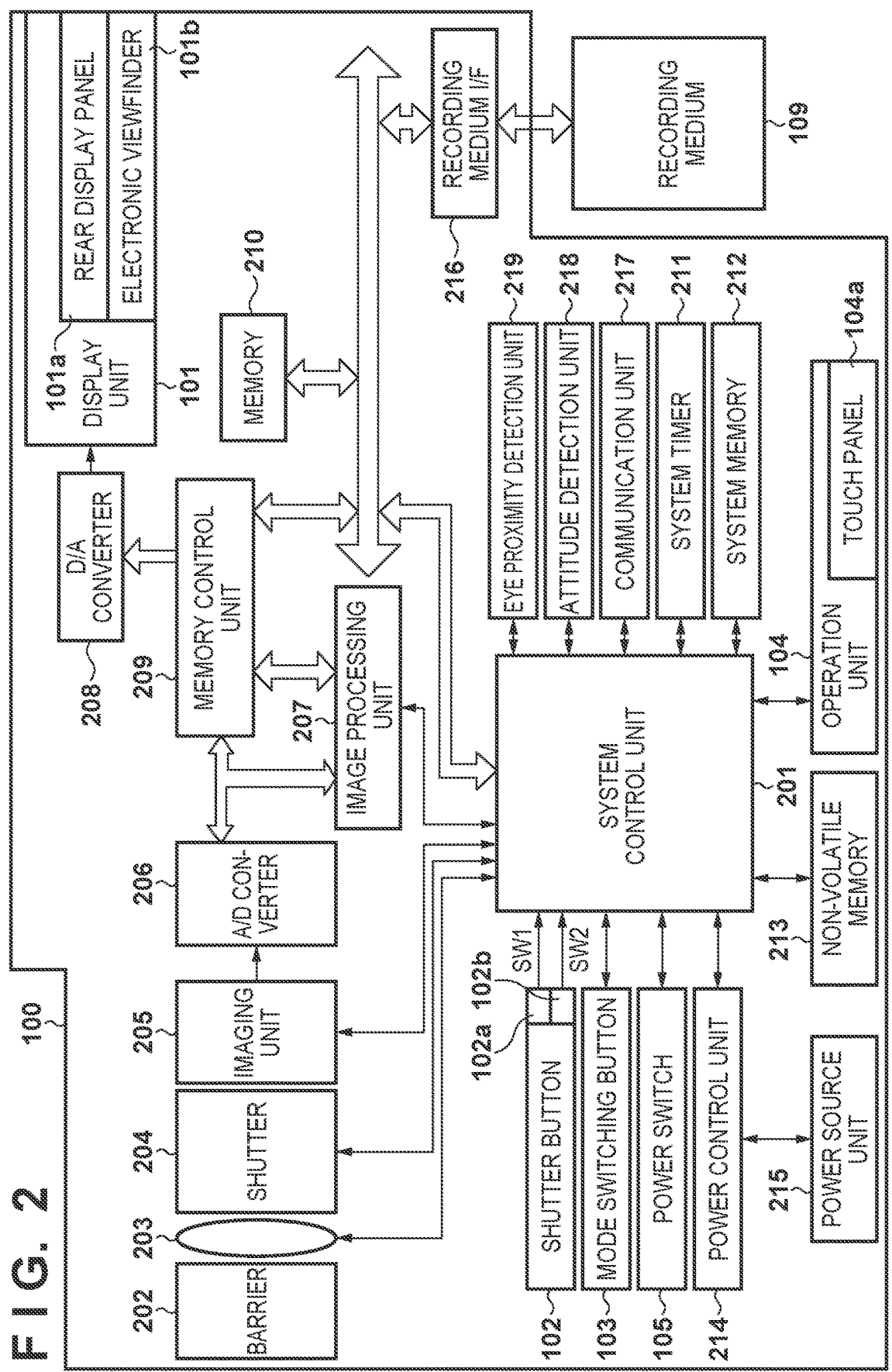
FIG. 2 is a block diagram illustrating the configuration of the digital camera.

In FIG. 2, which illustrates the internal configuration of the digital camera 100 according to the present embodiment, a photographing lens 203 is a lens group including a zoom lens and a focus lens. A shutter 204 has an aperture function. An image capture unit 205 is an image sensor constituted by a CCD, a CMOS, or the like that converts an optical image of an object into an electrical signal. An A/D converter 206 converts analog signals into digital signals. The A/D converter 206 is used to convert analog signals output from the image capture unit 205 into digital signals. A barrier 202 prevents an image capture system of the digital camera 100 including the photographing lens 203, the shutter 204, and the image capture unit 205 from being soiled or damaged by covering the image capture system including the photographing lens 203.

An image processing unit 207 carries out predetermined pixel interpolation, resizing processing such as reduction, color conversion processing, and the like on data from the A/D converter 206 or data from a memory control unit 209. The image processing unit 207 also performs predetermined computational processing using captured image data, and a system control unit 201 performs exposure control and range-finding control based on results obtained from these computations. A TTL (through-the-lens) AF (autofocus) process, an AE (automatic exposure) process, and an EF (flash pre-emission) process are realized as a result. The image processing unit 207 also performs predetermined computational processes using the captured image data, performing a TTL AWB (auto white balance) process on the basis of the obtained computation results.

Data output from the A/D converter 206 is written directly into memory 210 through the image processing unit 207 and the memory control unit 209, or through the memory control unit 209. The memory 210 stores the image data obtained by the image capture unit 205 and converted into digital data by the A/D converter 206, image data for display in the display unit 101, and the like. The memory 210 has a storage capacity sufficient to store a predetermined number of still images, a predetermined time's worth of moving images and audio, and so on.

The memory 210 also functions as image display memory (video memory). A D/A converter 208 converts data for image display, stored in the memory 210, into an analog signal and supplies the analog signal to the display unit 101 image data for display written into the memory 210 thus displayed by the display unit 101 via the D/A converter 208 in this manner. The display unit 101 carries out a display in the display device, which is an LCD or the like, based on the analog signal from the D/A converter 208. A digital signal subjected to A/D conversion by the A/D converter 206 and stored in the memory 210 is converted to an analog signal by the D/A converter 208, and is then sequentially transferred to and displayed in the display unit 101, thus realizing a live view image display.

Non-volatile memory 213 is electrically erasable/recordable memory, and EEPROM is used, for example. Operational constants, programs, and so on of the system control unit 201 are stored in the non-volatile memory 213. Here, "programs" refers to programs for executing the various flowcharts according to the present embodiment, which will be described later.

The system control unit 201 controls the entire digital camera 100. The respective processes according to the present embodiment, which will be mentioned later, are realized by executing programs stored in the non-volatile memory 213 mentioned above. 212 indicates system memory, and RAM is used for the system memory. Operational constants and variables for the system control unit 201, programs read from the non-volatile memory 213, and so on are loaded into the system memory 212. The system control unit 201 also carries out display control by controlling the memory 210, the D/A converter 208, the display unit 101, and so on.

A system timer 211 is a time measurement unit that measures times used in various types of control, measures the time of an internal clock, and so on.

The mode switching button 103, a first shutter switch 102a, a second shutter switch 102b, and the operation unit 104 are operation means for inputting various types of operating instructions to the system control unit 201.

The mode switching button 103 switches an operating mode of the system control unit 201 among a still image shooting mode, a moving image recording mode, a playback mode, and so on. Examples of modes included in the still image shooting mode are an auto mode, an auto scene determination mode, a manual mode, various types of scene modes in which shooting settings are configured for each type of scene, a program AE mode, a custom mode, and so on. Any one of these modes can be switched to directly using the mode switching button 103. Alternatively, the mode switching button 103 may be used to switch to a shooting mode selection screen, and the mode may then be switched by using another operation member to select any one of options which are displayed in the shooting mode selection screen and which correspond to the respective shooting modes. Likewise, the moving image recording mode may include a plurality of modes.

The first shutter switch 102a switches on partway through the manipulation of the shutter button 102 provided in the digital camera 100, or in other words, when the button is depressed halfway (a shooting preparation instruction), and produces a first shutter switch signal SW1. Shooting preparation processes, such as an AF process, an AE process, an AWB process, and an EF process, are started in response to the first shutter switch signal SW1.

The second shutter switch 102b turns on when the shutter button 102 is completely manipulated, or in other words, is fully depressed (a shooting instruction), and produces a second shutter switch signal SW2. The system control unit 201 commences a series of shooting processes, from reading out signals from the image capture unit 205 to writing image data into the recording medium 109, in response to the second shutter switch signal SW2.

Functions relevant for different scenes are assigned to the operation members of the operation unit 104, which then act as various types of function buttons, by making an operation for selecting various types of function icons displayed in the display unit 101. An end button, a return button, a next image button, a jump button, a sort button, an attribute change button, and so on are examples of the function buttons. For example, a menu screen in which various types of settings can be made is displayed in the display unit 101 when a menu button is pressed. A user can make various types of settings intuitively using the menu screen displayed in the display unit 101, along with up, down, left, and right directional buttons, a set button, and so on.

The controller wheel 106 is an operation member, included in the operation unit 104, that can be rotationally manipulated, and is used along with the directional buttons when specifying items to be selected and so on.

A power control unit 214 is constituted by a battery detection circuit, a DC-DC converter, switch circuits for switching the blocks through which power elapses, and so on, and detects whether or not a battery is connected, the type of the battery, the remaining battery power, and so on. The power control unit 214 also controls the DC-DC converter based on the detection results and instructions from the system control unit 201, and supplies a necessary voltage for a necessary period to the various units, including the recording medium 109.

A power source unit 215 is a primary battery such as an alkaline battery, a lithium battery, or the like, a secondary battery such as a NiCd battery, a NiMH battery, a lithium-ion battery, or the like, an AC adapter, or the like. A recording medium I/F 216 is an interface for the recording medium 109 such as a memory card, a hard disk, or the like. The recording medium 109 is a recording medium for recording shot images, such as a memory card or the like, and is constituted by a semiconductor memory, a magnetic disk, or the like.

A communication unit 217 communicatively connects to an external device using a wireless antenna, a hard-wire cable, or the like, and exchanges video, audio, and so on. The communication unit 217 can also connect to a wireless LAN (local area network), the Internet, and so on. The communication unit 217 can send image data captured by the image capture unit 205 (including live view images), image files recorded into the recording medium 109, and so on to the external device, and can receive image data, various other types of information, and so on from the external device.

An attitude detection unit 218 detects the attitude of the digital camera 100 relative to the gravitational direction. Whether an image captured by the image capture unit 205 was shot with the digital camera 100 held horizontally or shot with the digital camera 100 held vertically can be determined in accordance with the attitude detected by the attitude detection unit 218. The system control unit 201 can add information pertaining to the attitude detected by the attitude detection unit 218 to image data captured by the image capture unit 205, rotate and store the image data on the basis of that information, and so on. An accelerometer, a gyrosensor, or the like can be used as the attitude detection unit.

An eye proximity detection unit 219 detects whether an eye (an object) has approached (eye proximity) or has moved away from (eye non-proximity) the eyepiece part of the viewfinder (proximity detection). The system control unit 201 switches the rear display panel 101a and the EVF 101b between displaying (a display state)/not displaying (a non-display state) in accordance with the state detected by the eye proximity detection unit 219. For example, the eye proximity detection unit 219 can use an infrared proximity sensor, and can therefore detect when an object is in the proximity of the eyepiece part of the viewfinder that includes the EVF 101b. When an object is in the proximity, infrared rays emitted from a light-emitting unit (not illustrated) of the eye proximity detection unit 219 are reflected and received by a light-receiving unit (not illustrated) of the infrared proximity sensor. The distance of the object from the eyepiece part (an eye proximity distance) can also be determined on the basis of the amount of infrared light that has been received. In this manner, the eye proximity detection unit 219 carries out eye proximity detection, in which the distance of an object in the proximity of the eyepiece part is detected. When, in an eye non-proximate state (a non-proximate state), an object has been detected within a predetermined distance from the eyepiece part of the viewfinder, it is determined that eye proximity has been detected. When, in the eye-proximate state (a proximate state), the object that had been detected as being in the proximity moves away by greater than or equal to a predetermined distance, it is determined that eye non-proximity has been detected. A threshold for detecting eye proximity and a threshold for detecting eye non-proximity may differ by, for example, applying hysteresis. Additionally, after eye proximity has been detected, the eye-proximate state is considered to be in effect until eye non-proximity has been detected. Additionally, after eye non-proximity has been detected, the eye non-proximate state is considered to be in effect until eye proximity is detected. Note that the infrared proximity sensor is an example, and another sensor may be employed as the eye proximity detection unit 219 as long as that sensor is capable of detecting that an eye or an object is nearby to indicate eye proximity.

A touch panel 104a capable of detecting contact with the rear display panel 101a is included as part of the operation unit 104. The touch panel 104a and the rear display panel 101a can be configured as an integrated unit. For example, the touch panel 104a is configured having a light transmittance that does not interfere with the display of the rear display panel 101a, and is then attached to the top layer of the display surface of the rear display panel 101a. Input coordinates of the touch panel 104a are then associated with display coordinates of the rear display panel 101a. This makes it possible to configure a GUI (graphical user interface) in which the user seems capable of directly manipulating the screen displayed in the rear display panel 101a. In other words, a touch detection surface of the touch panel 104a serves as the display surface of the rear display panel 101a. An in-cell touch panel display, in which the display element of the rear display panel 101a and an electrostatic capacitance-type touch detection (touch sensing) electrode are configured integrally without a separator interposed therebetween, may be used as well. The system control unit 201 can detect the following operations or states with respect to the touch panel 104a.

When a finger or pen that had not been touching the touch panel 104a newly touches the touch panel 104a. In other words, this is the start of a touch (called "touch-down" hereinafter).

When a finger or pen is touching the touch panel 104a (called "touch-on" hereinafter).

When a finger or pen is moved while touching the touch panel 104a (called "touch-move" hereinafter).

When a finger or pen that had been touching the touch panel 104a is released. In other words, this is the end of a touch (called "touch-up" hereinafter).

When nothing is touching the touch panel 104a (called "touch-off" hereinafter).

When a touch-down is detected, a touch-on is detected at the same time. A touch-on normally continues to be detected after a touch-down as long as no touch-up is detected. A touch-move being detected is also a state in which a touch-on is detected. Even if a touch-on is detected, a touch-move is not detected as long as the touched position does not move. A touch-off occurs after a touch-up has been detected for all fingers or pens that had been touching.

These operations/states, positional coordinates on the touch panel 104a where the finger or pen had been touching, and so on are communicated to the system control unit 201 through an internal bus. The system control unit 201 determines what type of operation (touch operation) has been made on the touch panel 104a on the basis of the communicated information. With respect to a touch-move, the movement direction of the finger or pen moving on the touch panel 104a can be determined on the basis of changes in the positional coordinates, for each of a vertical component and a horizontal component on the touch panel 104a. A slide operation is determined to have been carried out if a touch-move of greater than or equal to a predetermined distance has been detected. If, while touching the touch panel, the finger or pen is quickly moved a given distance and then released, the operation is called "flicking". In other words, a "flick" is an operation of quickly flicking a finger on the touch panel 104a. A flick can be determined to have been carried out if a touch-move of greater than or equal to a predetermined distance and at greater than or equal to a predetermined speed is detected and a touch-up is then detected. Additionally, a drag is determined to have been carried out if a touch-move of greater than or equal to a predetermined distance and less than a predetermined speed has been detected, whereas a touch-down on the touch panel 104a quickly followed by a touch-up without a touch-move is called a "tap". Two taps executed in quick succession is called a "double tap". Furthermore, when a plurality of locations (two points, for example) are touched at the same time, and the touched positions are brought together, the touch operation is called a "pinch-in", whereas when the touched positions are moved apart, the touch operation is called a "pinch-out". Pinch-out and pinch-in are collectively referred to as pinch operations (or simply "pinching").

Any of a variety of types of touch panels, such as resistive film, electrostatic capacitance, surface elastic wave, infra-red, electromagnetic induction, image recognition, and photodetector, may be used as the touch panel 104a. Depending on the type, a touch is detected when contact is made with the touch panel, or a touch is detected when a finger or pen has approached the touch panel, and either of these types may be used.

Note that the hardware configuration is not limited to that illustrated in FIG. 2; for example, a single piece of hardware may carry out display control, communication control, shooting control, image processing control, and so on, and function as the various units of the digital camera 100. Likewise, a plurality of pieces of hardware may operate in tandem to function as a single unit.

The digital camera 100 is capable of switching between and using at least a playback mode, in which images are played back, and a shooting mode, which is used for shooting. The shooting mode includes an auto mode, a manual mode, and a plurality of scene-specific shooting modes. The auto mode is a mode in which various types of camera parameters are automatically set by a program incorporated into the digital camera 100, on the basis of a measured exposure value. The manual mode is a mode in which the user can freely change the various types of camera parameters. The scene-specific shooting modes are modes realized by combining a shutter speed, aperture value, flash emission state, sensitivity setting, white balance (WB) setting, and so on suited to a given shooting scene, for each of such shooting scenes. The digital camera 100 includes the following scene-specific shooting modes (1) to (3), for example. However, the scene-specific shooting modes are not limited to these modes.
(1) Portrait shooting mode: a mode specialized for shooting a person, in which the background is blurred so that the person stands out.
(2) Flower shooting mode: a mode that sets a macro mode and sets a higher saturation.
(3) Sports shooting mode: a shooting mode using settings specialized for shooting quickly-moving objects.

A shooter can set the digital camera 100 to a desired shooting mode from the shooting mode selection screen and take a shot.

The present invention is not limited to a camera body, and can also be applied in a control apparatus that communicates with an image capturing apparatus (including a network camera) through wired or wireless communication and remotely controls the image capturing apparatus. Apparatuses such as a smartphone, which is a type of mobile phone, a tablet PC, a desktop PC, and the like can be given as examples of control apparatuses that remotely control an image capturing apparatus. The image capturing apparatus can be controlled remotely by the control apparatus communicating commands for carrying out various types of operations, settings to the image capturing apparatus, and the like on the basis of operations made in the control apparatus, processes carried out by the control apparatus, and the like. Additionally, a live view image shot by the image capturing apparatus may be received by the control apparatus through wired or wireless communication and displayed.

Shooting Process

The shooting modes of the digital camera 100 according to the present embodiment will be described next with reference to FIGS. 3A to 3C and 11A to 11F.

Figure 3A:
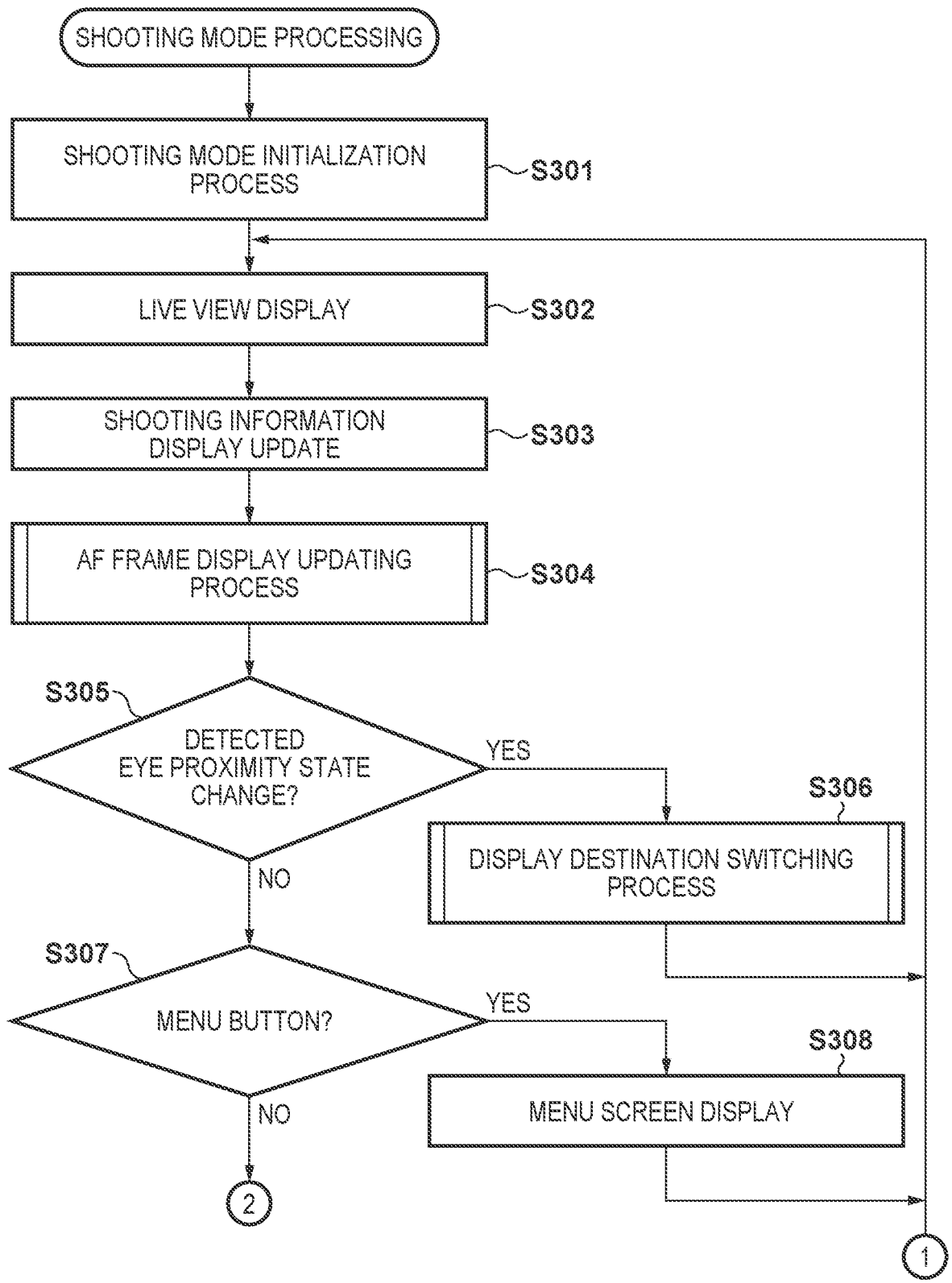
FIG. 3A is a flowchart illustrating a shooting mode process.
Figure 3B:
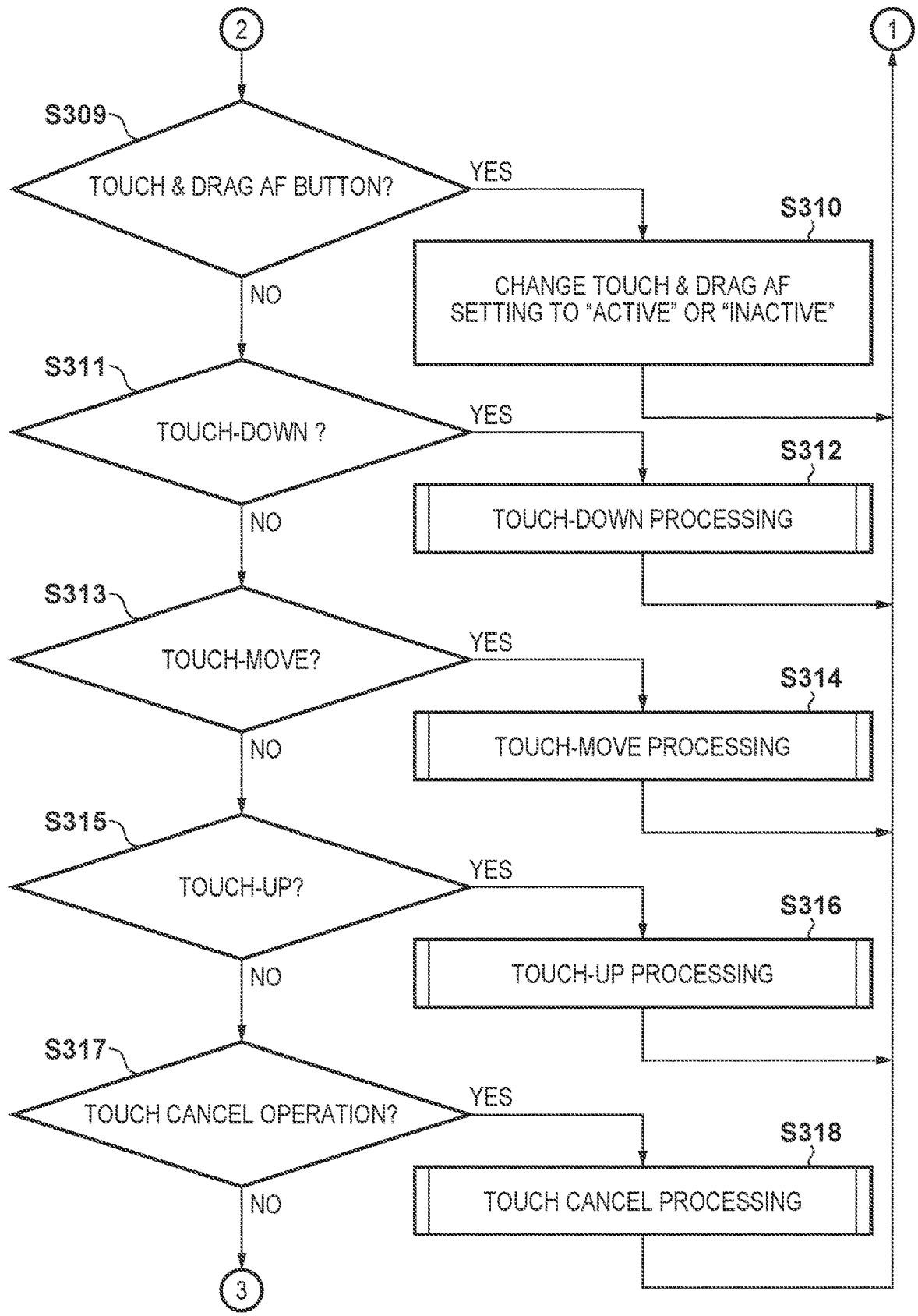
FIG. 3B is a flowchart illustrating the shooting mode process.

Note that the processing illustrated in FIGS. 3A to 3C is realized by the system control unit 201 reading out a program recorded in the non-volatile memory 213 into the system memory 212 and executing that program. When the digital camera 100 is started up in the shooting mode, the shooting mode process illustrated in FIGS. 3A to 3C is started.

In S301, the system control unit 201 carries out a shooting mode initialization process. The initialization process is a process for reading out parameters including flags and control variables, setting values, setting modes, and the like from the non-volatile memory 213. Additionally, the system control unit 201 determines the state of the recording medium 109, and if there is a malfunction or the like, displays a warning or the like during a shooting information display, which will be described later.

In S302, the system control unit 201 captures an image using the image capture unit 205, and displays the captured image as a live view image ("LV image" hereinafter) in whichever of the rear display panel 101a and the EVF 101b, included in the display unit 101, is the current display destination. Hereinafter, a display made in whichever of the rear display panel 101a and the EVF 101b, included in the display unit 101, is the current display destination, will simply be referred to as "displaying in the display unit 101".

In S303, the system control unit 201 displays information pertaining to the shooting in the display unit 101, superimposed on the LV image. For example, a shooting mode icon indicating the current shooting mode, the remaining battery power, the remaining number of shots that can be taken, shooting setting information such as the shutter speed, aperture value, sensitivity, and recording quality, and the like are displayed as the information displayed here.

In S304, the system control unit 201 carries out an AF frame display updating process (display content change). The AF frame display updating process will be described later using FIG. 4.

In S305, the system control unit 201 determines whether or not there has been a change in the detection state of the eye proximity detection unit 219. A change in the detection state refers to an eye being detected as approaching after an eye non-proximate state, and an eye being detected as moving away after an eye-proximate state. The process moves to S306 if there has been a change in the detection state, and moves to S307 if there has been no change.

In S306, the system control unit 201 carries out a display destination switching process. The display destination switching process will be described later using FIGS. 5A and 5B.

In S307, the system control unit 201 determines whether or not the menu button included in the operation unit 104 has been pressed. The process moves to S308 if the menu button has been pressed, and moves to S309 if such is not the case.

In S308, the system control unit 201 carries out a menu screen display process. In the menu screen display process, the menu screen is displayed in the display unit 101, and various types of settings are made in response to user operations. When an operation for closing the menu screen (an operation for ending the setting operations, an operation for exiting the menu screen, or an operation of pressing the shutter button 102 halfway) has been made, the menu screen process is ended, and the processing returns to S302.

FIGS. 12A to 12C are diagrams illustrating examples of the display of the menu screen. FIG. 12A is an example of the display of a shooting settings menu screen. The menu screen is divided into groups on the basis of functions, such as a shooting settings menu, a system settings menu, a playback settings menu, and so on, and selecting a tab corresponding to a group makes it possible to display that corresponding group. FIG. 12A illustrates a state in which a shooting settings menu tab 1201 is selected and the shooting settings menu is displayed. The user moves a cursor 1204 by pressing the up, down, left, and right buttons included in the operation unit 104, and then transitions to a screen for changing the settings of a desired function by pressing the set button. A menu item 1202 is a menu item for setting the AF mode, and the AF mode can be set by selecting this item (AF mode settings). A plurality of AF modes are prepared for each of systems for determining a position at which to carry out AF (autofocus), and the user can select and set one of the plurality of AF modes. The present embodiment assumes that a single-point AF mode and a tracking mode can be set as the AF mode. The single-point AF mode is an AF mode in which an AF frame expressing a focus adjustment position is set in the center of the shooting range or at a single point designated by the user. In the single-point AF mode, the AF frame does not move even if the object changes, and the AF is carried out on the basis of information obtained from the position of the AF frame (a contrast value, a defocus amount for phase difference-based AF, and the like) regardless of whether or not an object such as a face has been detected. In the tracking mode, if the user has not instructed tracking to be carried out (a tracking standby or tracking canceled state), an object automatically determined by the digital camera 100 to be a primary object is used as the target for AF (the focus adjustment position). If a person's face has been detected, the face is handled as the primary object and is preferentially targeted for AF. If a person's face has not been detected, the digital camera 100 automatically determines the primary object in accordance with predetermined conditions, such as object movement, an object having a high contrast value, an object near the center, and so on, and sets that object as the target for AF. After the user has instructed tracking to be carried out, and object designated in the LV image continues to be tracked, and the object being tracked is targeted for AF. For example, if the user has designated the face of a person A to be tracked (with tracking underway), the face of the person A continues to be tracked in the LV image even if the person A has moved, and the face of the person A is targeted for AF. An object aside from a person can also be used as the tracking target (object tracking), so that even if the object has moved, the object continues to be tracked in the LV image in accordance with conditions such as the color, contrast, shape, and so on of a position designated for tracking, and that object is targeted for AF. In other words, the tracking mode is an AF mode in which the AF position can be determined through tracking. Note that the AF modes are not limited to the single-point AF mode and the tracking mode. For example, an AF mode in which tracking is carried out within a limited region designated by the user ("zone AF") or the like may be used. The set AF mode is stored in the non-volatile memory 213, and is read out into the system memory 212 during the shooting mode process.

FIG. 12B is an example of the display of a settings screen pertaining to touch & drag AF, displayed in the display unit 101. The touch & drag AF settings screen is displayed when a touch & drag AF item is selected from among the menu items included in the shooting settings menu. A screen title 1211 and settings items 1212, 1213, and 1214 are displayed in the touch & drag AF settings screen.

The settings item 1212 can be used to set the touch & drag AF to "active" or "inactive". If "active" is set, the touch & drag AF is activated (on), and the AF position can be changed in response to a touch-move made while in the eye-proximate state. If "inactive" is set, the touch & drag AF is deactivated (off), and the AF position does not change even if a touch-move is made while in the eye-proximate state. If the touch & drag AF is set to "inactive", touch detection in the touch panel 104a may be stopped in response to eye proximity being detected in order to eliminate power consumption for driving the touch panel 104a. The details that have been set are stored in the non-volatile memory 213, and are read out into the system memory 212 during the shooting mode process.

The settings item 1213 can be used, when the touch & drag AF is "active", to set a method for designating the AF position in response to a touch operation while eye proximity is being detected to absolute position designation or relative position designation. The default value is "absolute position designation". With absolute position designation, positional coordinates within the operation surface of the touch panel 104a are uniquely associated with an AF-capable region within the shooting range, and when the touch panel 104a is touched, the AF position is set to the position, within the shooting range, that is associated with the position that has been touched. Accordingly, if, for example, the user wishes to use the position of an object appearing in the lower-right of the LV image as the AF position, he or she can set the AF position to the lower-right by touching a lower-right position in the touch panel 104a. On the other hand, with relative position designation, the positional coordinates within the operation surface of the touch panel 104a are not uniquely associated with the AF-capable region within the shooting range. In relative position designation, when a touch-move is made in the touch panel 104a, the AF position is moved from the currently-set AF position, in the movement direction of the touch-move and by a distance corresponding to the amount of movement in the touch-move, regardless of the touch-down position. This is an operation similar to when a cursor is moved using a mouse with a personal computer. The details that have been set are stored in the non-volatile memory 213, and are read out into the system memory 212 during the shooting mode process.

The settings item 1214 can be used, when the touch & drag AF is set to "active", to set a range of a touch region, in the touch panel 104*a*, for accepting touch operations while eye proximity is being detected (a touch response region). In touch & drag AF, touch operations are made while viewing the EVF 101*b*, and there is thus a chance that the user's nose, for example, will touch the touch panel 104*a*. If the nose touching in this manner is accepted as an operation instructing the touch position to be moved, the AF position will move to an undesired position. To prevent this from happening, means for limiting the touch response region are provided. If the nose touches a region that is not the touch response region, that touch will not be accepted as an operation for moving the touch position, which makes it possible to prevent the AF position from moving to an undesired position in response to the nose touching. When the settings item 1214 is selected, the advanced settings screen illustrated in FIG. 12C is displayed. The advanced settings screen displays options for enabling the user to select which region of the touch panel 104*a* is to be used as the touch response region. The region selected from among these options is set as the touch response region in the eye-proximate state, and the regions aside from the region set as the touch response region are touch-inactive regions in the eye-proximate state. Although the options that can be set as the touch response region are "all", "right", "left", "upper-right", "lower-right", "upper-left", and "lower-left" in this example, the options are not limited thereto. Note that the setting of the touch response region is a setting that is applied in the eye-proximate state in the case where touch & drag AF is set to "active". The entire touch panel 104*a* is a touch-inactive region (unresponsive region) when touch & drag AF is set to "inactive" in the eye-proximate state, regardless of the setting of the settings item 1214. In the eye non-proximate state, the entire touch panel 104*a* is a touch-active region (responsive region), regardless of the touch & drag AF settings and the settings of the settings item 1214.

Returning to the descriptions of FIGS. 3A to 3C, in S309, the system control unit 201 determines whether or not a touch & drag AF button included in the operation unit 104 has been pressed. The process moves to S310 if the touch & drag AF button has been pressed, and moves to S311 if such is not the case.

Figure 11A:
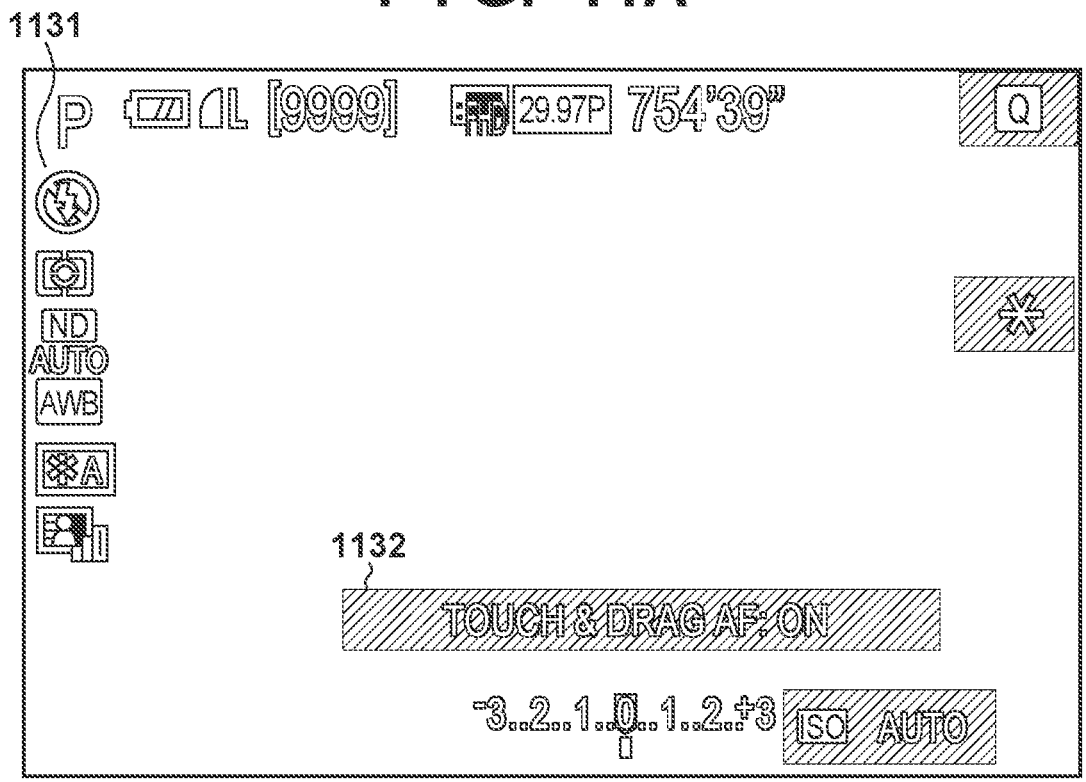
FIG. 11A is a diagram illustrating an example of a display screen in a shooting mode.

In S310, the system control unit 201 switches the setting of the above-described touch & drag AF to "active" or "inactive", and displays guidance indicating that the setting has been changed. In other words, the setting of the settings item 1212 can be changed without displaying the settings screen illustrated in FIG. 12B, with the LV image remaining displayed instead. FIG. 11A illustrates an example of the display in the display unit 101 in the case where the touch & drag AF setting has been changed from "inactive" to "active" in response to the touch & drag AF button being pressed. As illustrated in FIG. 11A, guidance 1132, indicating the touch & drag AF setting value, is displayed superimposed over an LV image 1131 (FIG. 11A indicates the guidance displayed when the touch & drag AF setting has been changed to "active"). The guidance 1132 is hidden after a predetermined amount of time (e.g., two seconds) has elapsed. Note that the user can customize functions assigned to the touch & drag AF button in advance, and can therefore also assign (register) functions aside from switching touch & drag AF to "active" or "inactive". The process of S310 is not carried out if a function aside from switching touch & drag AF to "active" or "inactive" has been assigned. The function assigned to the touch & drag AF button at that point in time is assumed to be executed instead. An instruction to start recording a moving image, switching the flash settings between firing/not firing, switching a touch shutter, in which shooting is executed in response to a touch-down, on/off, an aperture narrowing function, and the like can be given as examples of functions that can be assigned to the touch & drag AF button. The "aperture narrowing function" is a function that allows the state of focus (the degree of blurriness) to be determined when an image is shot at the set aperture value. When the aperture narrowing function is assigned, the aperture narrowing function is active while the button is being pressed.

In S311, the system control unit 201 determines whether or not a touch-down has been detected. The process moves to S312 if a touch-down has been detected, and moves to S313 if such is not the case. In S312, the system control unit 201 carries out a touch-down process. The touch-down process will be described later using FIGS. 6A to 6C.

In S313, the system control unit 201 determines whether or not a touch-move has been detected in a touch-on state. The process moves to S314 if a touch-move has been detected, and moves to S315 if such is not the case (including a touch-off state). In S314, the system control unit 201 carries out a touch-move process. The touch-move process will be described later using FIGS. 7A and 7B.

In S315, the system control unit 201 determines whether or not a touch-up has been detected. The process moves to S316 if a touch-up has been detected, and moves to S317 if such is not the case (including a case where a touch-off was originally in effect, and after a touch has been canceled in the touch cancel process, which will be described later). In S316, the system control unit 201 carries out a touch-up process. The touch-up process will be described later using FIGS. 8A and 8B.

In S317, the system control unit 201 determines whether or not a touch cancel operation has been detected. The process moves to S318 if the touch cancel process has been carried out, and moves to S319 if the touch cancel process has not been carried out. The "touch cancel operation" is an operation on a unit aside from the touch panel 104*a* during a touch-on state, for example (an operation on a unit, in the operation unit 104, aside from the touch panel 104*a*). When the operation unit 104 is operated while in a touch-on state, the touch-on state is canceled and the operation of the operation unit 104 is accepted as valid. For example, when the shutter button 102 is pressed halfway, the touch cancel process is carried out and the shooting preparation process is started. In S318, the system control unit 201 carries out the touch cancel process. The touch cancel process will be described later using FIGS. 9A and 9B.

In S319, the system control unit 201 determines whether or not a frame button included in the operation unit 104 has been pressed. The process moves to S320 if the frame button has been pressed, and moves to S321 if such is not the case. In S320, the system control unit 201 carries out a frame button process. The frame button process will be described later using FIG. 10.

In S321, the system control unit 201 determines whether or not the first shutter switch 102*a* and the second shutter switch 102*b* have turned on. The process moves to S322 if the switches are turned on, and moves to S323 if such is not the case.

In S322, the system control unit 201 carries out the shooting preparation process in accordance with the first shutter switch 102*a* being on (the shutter button 102 being pressed halfway) and a shooting process in accordance with the second shutter switch 102b being on (the shutter button 102 being pressed fully). In the shooting preparation process of S322, processes such as AF, AE, AWB, and the like are carried out through touch & drag AF and so on, on the basis of the AF position set at that point in time.

In S323, the system control unit 201 determines whether or not a shooting mode ending operation (an operation for turning the power off, an operation for transitioning to the playback mode, or the like) has been made. The process moves to S324 if the ending operation has not been made, and the system control unit 201 then carries out other processes. A process for changing the shutter speed or the like in response to the operation unit 104 being operated is carried out, for example. If an ending operation has been made in S323, the shooting mode process ends.

AF Frame Display Updating Process

The AF frame display updating process carried out in S304 of FIG. 3A will be described in detail next using FIG. 4.

In S401, the system control unit 201 refers to the settings information held in the system memory 212, and determines whether or not the AF mode is single-point AF. The process moves to S402 if the AF mode is single-point AF, and moves to S404 if such is not the case.

In S404, the system control unit 201 determines whether or not an object is currently being tracked. The process moves to S405 if an object is currently being tracked, and moves to S406 if such is not the case.

Figure 11B:
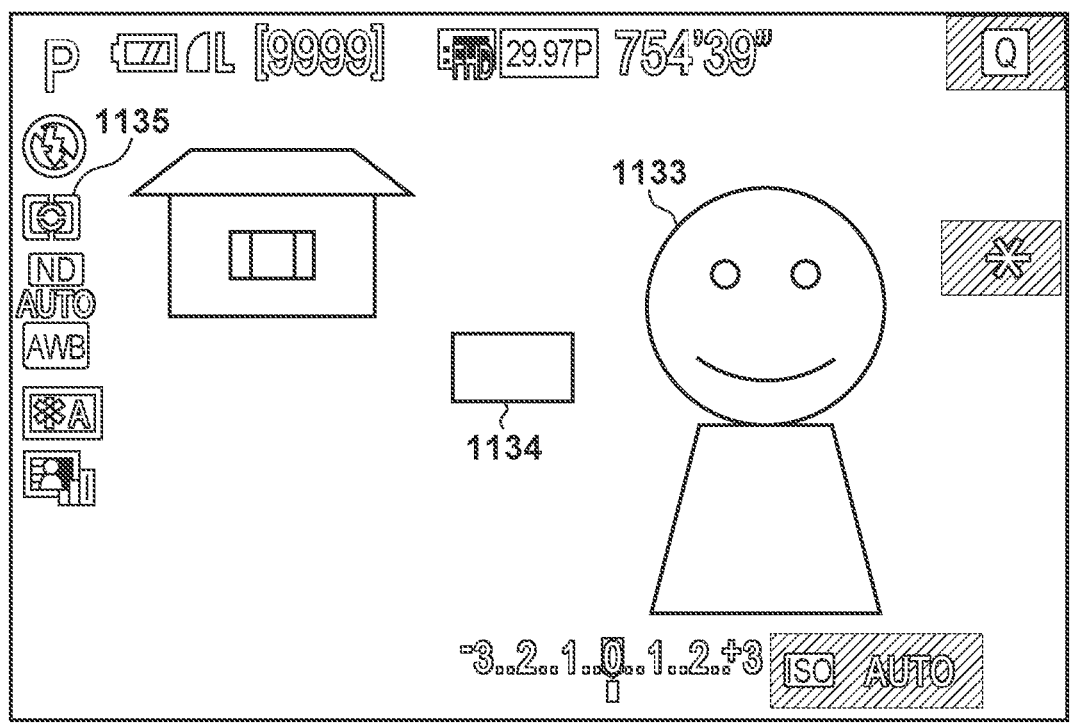
FIG. 11B is a diagram illustrating an example of a display screen in a shooting mode.

In S402, the system control unit 201 displays a single-point AF frame in the display unit 101. FIG. 11B illustrates an example of the display of the single-point AF frame. In FIG. 11B, a single-point AF frame 1134, and shooting information 1135 indicating shooting parameters, are displayed overlapping an LV image including an object 1133. The position of the single-point AF frame 1134 can be moved to a position in the LV image designated by the user by making an operation in the touch panel 104a, or by operating the up, down, left, and right buttons included in the operation unit 104 while in a frame movement mode. The position of the single-point AF frame 1134 serves as the AF position in S403, described later.

Figure 11C:
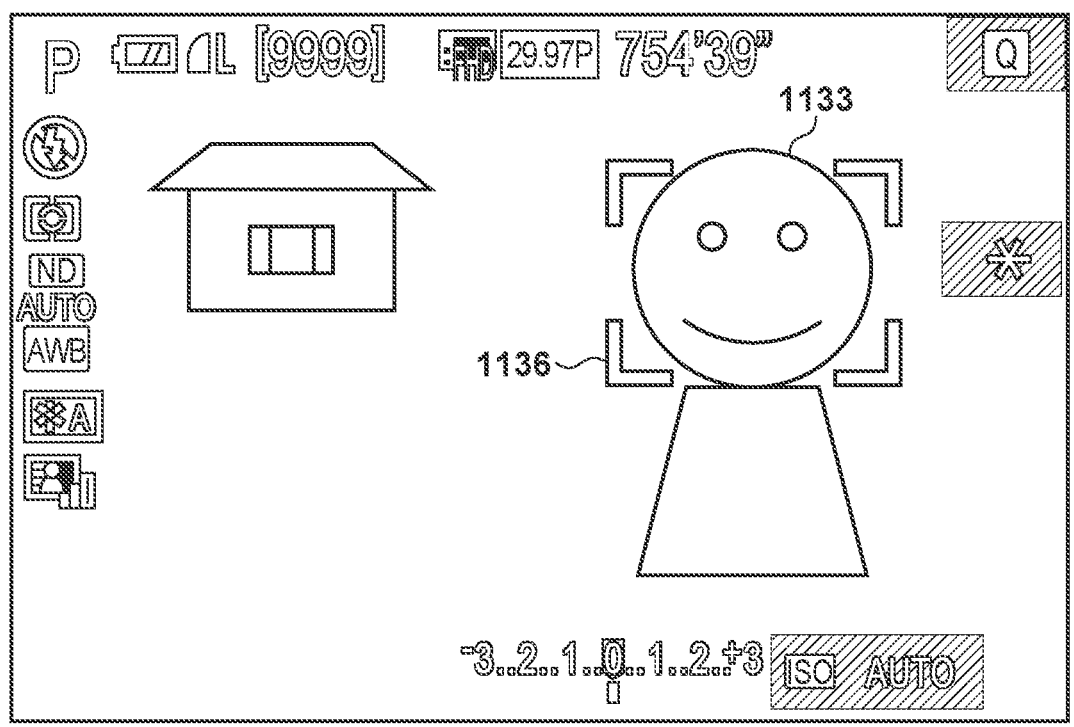
FIG. 11C is a diagram illustrating an example of a display screen in a shooting mode.
Figure 11D:
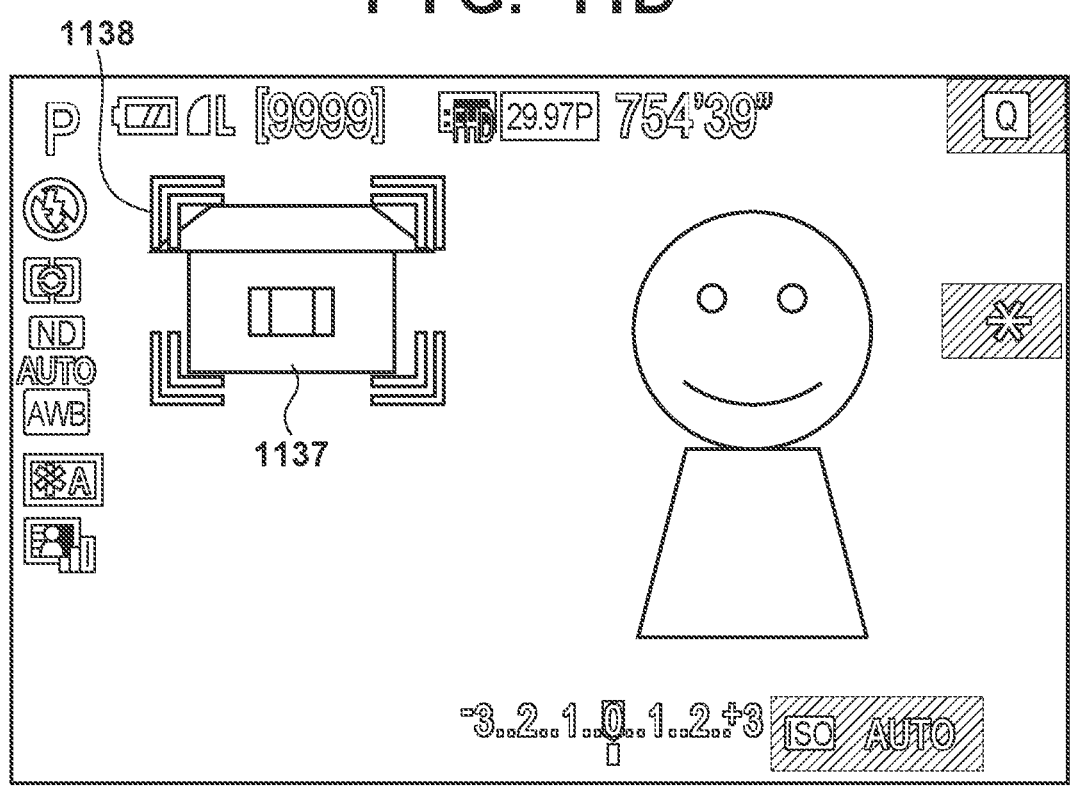
FIG. 11D is a diagram illustrating an example of a display screen in a shooting mode.

In S405, the system control unit 201 displays the position of the tracking target, and a tracking frame indicating that the tracking is underway, in the display unit 101. An example of the tracking frame display screen is illustrated in FIG. 11D. FIG. 11D illustrates a state in which an object 1137 is being tracked in a LV image. A tracking frame 1138 is displayed in the periphery of the object being tracked, which indicates that the object is being tracked. Even if the shooting range is changed by framing with the digital camera 100, the tracking frame 1138 will continue to indicate the object 1137 as long as the object 1137 is within the shooting range. The position of the tracking frame 1138 serves as the AF position in S403, described later.

In S406, the system control unit 201 determines whether or not a face (a specific object) has been detected from the LV image through a facial detection process (a specific object detection process). The process moves to S407 if a face has been detected, and moves to S408 if a face has not been detected.

In S407, the system control unit 201 displays a detection frame (detection indicator), indicating the position of the detected face, in the display unit 101. FIG. 11C illustrates an example of a detection frame display screen. FIG. 11C illustrates a state in which a face 1133 has been detected from the LV image. A detection frame 1136 is displayed in the periphery of the object being detected (the face), which indicates that the face is being detected. Note that a plurality of the detection frames 1136 may be displayed in accordance with the result of detecting the object. In other words, if a plurality of faces have been detected, a plurality of the detection frames 1136 (facial frames) are displayed. Note that the face is assumed to be detectable by the image processing unit 207 analyzing the LV image. Although the present embodiment describes an example in which a face is detected as a specific object that can be detected by the image processing unit 207, the object is not limited to a person's face, and the detection frame 1136 may be displayed for another object automatically determined by the digital camera 100 to be the primary object in the LV image. For example, if an object aside from a face, such as an animal's face, a moving object, a high-contrast object, or the like has been successfully detected, the detection frame may be displayed to indicate the AF position. Note that if a face has been detected, the face is basically treated as the primary object and given high priority. The position of the detection frame 1136 serves as the AF position in S403, described later.

In S407, the system control unit 201 hides the detection frame. In other words, if the detection frame had been displayed until immediately before, the detection frame is removed, whereas if the detection frame had not been displayed until immediately before, the detection frame remains hidden.

In S408, the system control unit 201 updates a position where continuous AF is carried out to the current AF position, and carries out continuous AF. "Continuous AF" is a function for carrying out AF operations continuously in a shooting standby state, so that the AF position is automatically brought into focus, even without the user making operations for executing AF.

Display Destination Switching Process

Figure 5B:
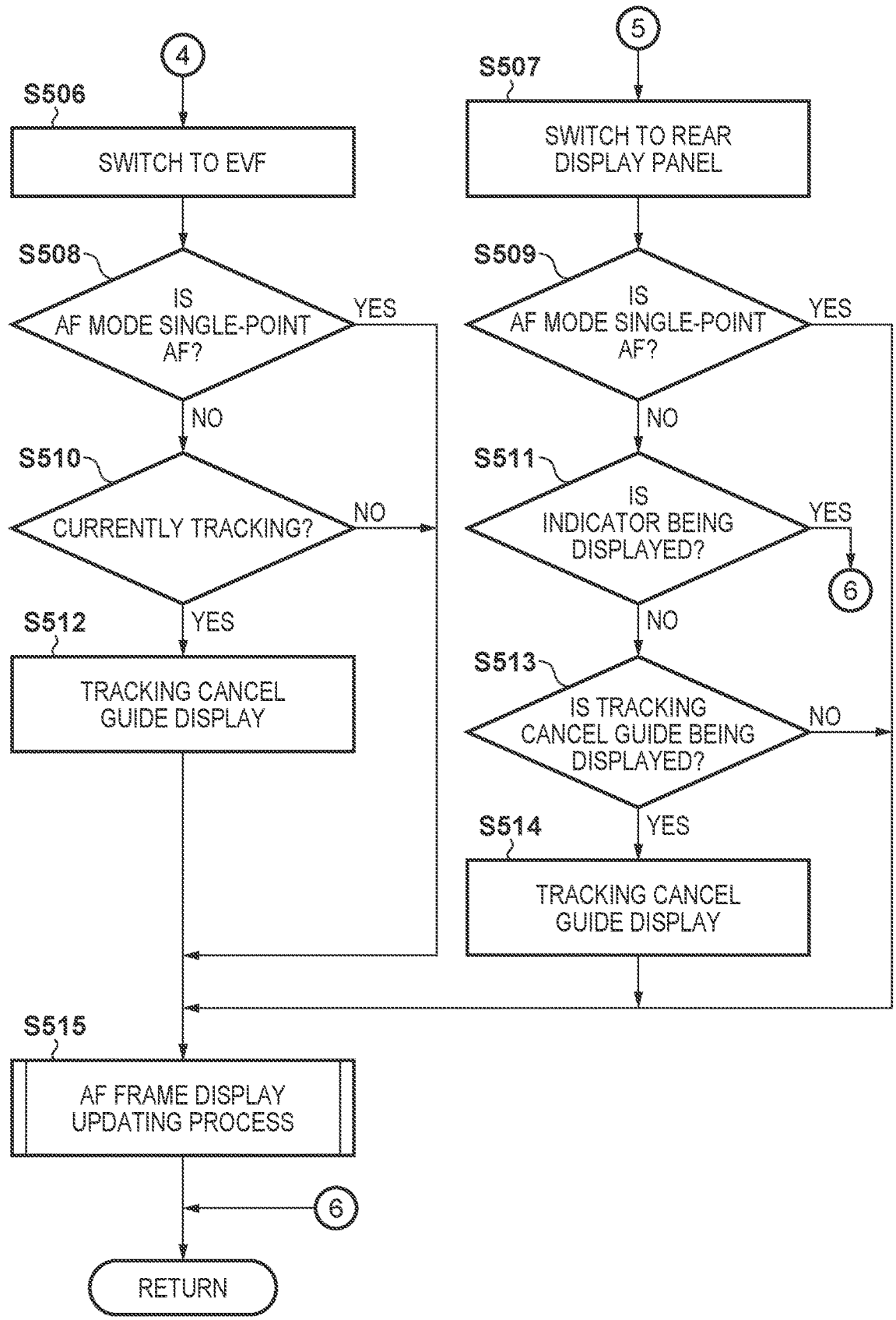
FIG. 5B is a flowchart illustrating the display destination switching process.

The display destination switching process carried out in S306 of FIG. 3A will be described in detail next using FIGS. 5A and 5B.

In S501, the system control unit 201 determines whether or not a change in the state detected by the eye proximity detection unit 219 is a change from the eye non-proximate state to the eye-proximate state (i.e., whether or not eye proximity has been detected). The process moves to S506 if the change was from the eye non-proximate state to the eye-proximate state, and moves to S502 if such is not the case.

In S506, the system control unit 201 switches the display destination from the rear display panel 101a to the EVF 101b. In S506, the display destination is switched from the rear display panel 101a to the EVF 101b immediately, even if a touch had been detected (touch-on) from before the change to the eye-proximate state (the detection of eye proximity), which was the cause of the display destination switch. On the other hand, if a determination of "no" was made in S501 (when eye non-proximity has been detected), the display destination is not immediately switched if there has been a touch-on from before the change to the eye-proximate state; this will be described later in S507.

In S508, the system control unit 201 refers to the settings information held in the system memory 212, and determines whether or not the AF mode is single-point AR The process moves to S515 if the AF mode is single-point AF, and moves to S510 if such is not the case (if the AF mode is the tracking mode).

In S510, the system control unit 201 determines whether or not an object designated by the user is currently being tracked. The process moves to S512 if it is determined that an object is being tracked, and moves to S515 if such is not the case.

In S512, the system control unit 201 displays a tracking cancel guide, indicating a tracking cancellation method, in the EVF 101b. By viewing this display, the user can cancel the object tracking as needed. The tracking cancel guide is a message display, an icon display, or the like. It is assumed that the tracking can be canceled by making a touch operation on an icon serving as the tracking cancel guide (only when the display destination is the rear display panel 101a), operating a button included in the operation unit 104, or the like.

On the other hand, in S502, the system control unit 201 refers to the settings information held in the system memory 212 and determines whether or not the above-described touch & drag AF setting is "active". The process moves to S503 if "active" is set, and moves to S507 if such is not the case. In S503, the system control unit 201 determines whether or not the current state is touch-on (whether or not a valid touch is being detected). The process moves to S504 if a touch-on is in effect, and moves to S507 if such is not the case.

In S504, the system control unit 201 determines whether or not an eye non-proximate state has continued for a predetermined amount of time (e.g., has continued for two seconds) in the eye proximity detection unit 219. The process moves to S505 if the state has continued for the predetermined amount of time, and moves to S507 if such is not the case.

In S505, the system control unit 201 determines whether or not there has been a change in the detection state of the eye proximity detection unit 219. The state before the detection in S505 was the eye non-proximate state, and thus the process of S505 is a determination as to whether or not eye proximity has been detected. The process moves to S501 if there has been a change (if eye proximity has been detected), whereas the process returns to S503 and the display in the EVF 101b is continued if there has been no change (if the non eye-proximate state remains in effect).

In S507, the system control unit 201 switches the display destination from the EVF 101b to the rear display panel 101a. This display destination switch is not carried out immediately if a touch-on has been in effect from before the change in the eye-proximate state (before eye non-proximity has been detected), as described with reference to S503 to S505. Instead, the display destination switch is carried out if touch-off was in effect when eye non-proximity was detected, and if touch-on was in effect when eye non-proximity was detected (YES is S503) but an eye non-proximate state has continued for a predetermined amount of time (YES in S504) or touch-off is in effect (NO in S803) after eye non-proximity was detected. The touch panel 104a is calibrated (an initialization process) when the switch to the rear display panel 101a is made. With an electrostatic capacitance-type touch panel, the calibration adjusts an electrostatic capacitance value or an electrostatic capacitance threshold serving as a reference for determining whether or not a touch has been made. In an electrostatic capacitance-type touch panel, if the calibration is carried out in a state where the panel is touched, there is a risk that erroneous determinations, skew, or the like will arise in the determination as to whether or not a touch has been made and/or the calculation of a touched position in the touch-on state. Meanwhile, an in-cell touch panel is configured so that a separator is not interposed between the display element and the touch detection electrode, and thus there is a risk of interference between the driving of the display element and the touch detection. Accordingly, if the start of the display and the calibration of the rear display panel 101a are carried out at the same time while the panel is being touched, it is likely that erroneous determinations, skew, or the like will arise in the determination as to whether or not a touch has been made and/or the calculation of a touched position. In response to this, in S507, if a touch-on has been in effect from before the change in the eye-proximate state (before eye non-proximity was detected), control is carried out so that calibration is not immediately executed, which makes it possible to carry out the calibration more accurately. Note that if the eye non-proximate state has continued for a predetermined amount of time following eye non-proximity (YES in S504), the display destination is switched from the EVF 101b to the rear display panel 101a, but it is possible to avoid carrying out the calibration until touch-off is in effect. In this case, the calibration is carried out once the touch-off is in effect. Note that if it is determined in S503 that a touch-on is not in effect but a designated position indicator (described later) is being displayed, the process may move to S504 to suppress the switching of the display destination under the assumption that a series of touch operations are midway through being carried out.

In S509, the system control unit 201 refers to the settings information held in the system memory 212, and determines whether or not the AF mode is single-point AR The process moves to S515 if the AF mode is single-point AF, and moves to S511 if such is not the case (if the AF mode is the tracking mode).

In S511, the system control unit 201 determines whether or not a designated position indicator (described in detail later) is currently being displayed. The process ends if the indicator is being displayed, and moves to S513 if such is not the case.

In S513, the system control unit 201 determines whether or not the tracking cancel guide is being displayed in the EVF 101b. The process moves to S514 if the guide is being displayed, and moves to S515 if such is not the case.

In S514, the system control unit 201 displays the tracking cancel guide in the rear display panel 101a. The tracking cancel guide is the same as that described with reference to S512.

In S515, the system control unit 201 carries out the AF frame display updating process. This process is the process described with reference to FIG. 4. Once the AF frame display updating process is carried out, the display destination switching process ends.

As described above, if the user is carrying out a touch operation using the touch panel 104a, the display destination is not switched even if the eye proximity detection unit 219 has detected eye non-proximity (S501 to S507). However, if no touch operation is being carried out, the display destination is switched, without waiting for the predetermined amount of time, if the eye proximity detection unit 219 has detected eye non-proximity (S501 to S506).

Touch & drag AF is a function for operating the touch panel 104a while viewing the rear display panel 101a. There are cases where the user mistakenly takes his or her eye away from the eye proximity detection unit 219, such as when moving his or her finger near the eye proximity detection unit 219 or moving his or her finger between his or her face and the touch panel 104a in order to operate the touch panel 104a. In this case, if the system control unit 201 immediately switches the display destination, it will be necessary to make an operation in the rear display panel 101a. There is thus a risk that a user who wishes to shoot while viewing the EVF 101b will be occupied with the operation and miss the chance for a shot. Furthermore, the repeated detection/non-detection of eye proximity will result in the EVF 101b repeatedly turning on and off, which reduces the usability. Although it is conceivable to make a display in the rear display panel 101a at the same time, without turning the EVF 101b off, when the user mistakenly takes his or her eye away from the eye proximity detection unit 219, doing so consumes an increased amount of power. Processing such as that illustrated in FIGS. 5A and 5B is carried out in order to solve this problem.

Depending on the shooting scene, a situation is also conceivable in which the user wishes to switch the display destination while touching the panel, and thus the display destination is switched to the rear display panel 101a when the eye non-proximate state has continued for a predetermined amount of time (YES in S504). However, the display in the EVF 101b may be continued without switching the display destination to the rear display panel 101a as long as the touch operation continues (as long as a touch-on is in effect), regardless of the amount of time for which the eye proximity detection unit 219 has continuously detected an eye non-proximate state.

Note that if a determination of "NO" is made in S501, the process may move to S507 without the processes of S502 to S505 being carried out. In other words, if eye non-proximity has been detected, the display destination may be switched from the EVF 101b to the rear display panel 101a regardless of whether or not a touch-on has been detected.

Additionally, whether or not to carry out the processes of S502 to S505 may be determined on the basis of whether a touch-on was made in the region set as the touch response region or a touch-on was made in a region aside from the region set as the touch response region. For example, if eye non-proximity has been detected when a touch-on was detected in a region aside from the touch response region (a touch-inactive region), the above-described processes of S502 to S505 may be carried out for the touch made in the region aside from the touch response region. The touch detected in the touch-inactive region is likely to be contact made by the user's nose. This makes it possible to avoid switching the display destination in a situation where eye proximity is no longer detected, and eye non-proximity has been detected, due to the user changing how he or she is holding the camera, for example, while his or her nose remains in contact (that is, while his or her eye is actually proximate). On the other hand, if eye non-proximity has been detected while a touch-on was detected in the touch response region but was not detected in a region aside from the touch response region, the process may move to S507, and the display destination may be switched, without carrying out the above-described processes of S502 to S505. This is because the situation is likely to be one in which the user has intentionally taken his or her eye away while continuing to touch the touch panel 104a with his or her operating finger in order to determine the rear display panel 101a.

Meanwhile, the rear display panel 101a may be configured as a tilt monitor or a vari-angle monitor, in which the panel can be pivoted to a desired position, attitude, and the like relative to the body of the digital camera 100. In this case, it is assumed that the digital camera 100 includes a monitor position detection unit that detects the position, attitude, and the like of the vari-angle monitor relative to the camera body. The above-described processes of S502 to S505 are carried out when the vari-angle monitor is detected as having been closed while the display surface of the rear display panel 101a is exposed on the rear surface side of the camera (i.e., is oriented in the same state as that illustrated in FIG. 1). On the other hand, if the vari-angle monitor is open, the process may move to S507, and the display destination may be switched, without carrying out the above-described processes of S502 to S505. This is because when the vari-angle monitor is open, the finger used to operate the touch panel 104a will not be positioned near the user's face, eye, or the like, and thus the above-described issue will not arise.

Although an example of control for suppressing the switching of the display destination based on whether or not a touch-on is in effect is given here, the operation is not limited to a touch operation, and the switching of the display destination may be suppressed when another operation member is operated. For example, it is possible to avoid switching the display destination while a button to which the above-described aperture narrowing function has been assigned is being operated. Additionally, the control for suppressing the switching of the display destination (S502 to S505) may be carried out for operation members near the eyepiece part of the EVF 101b, operation members which are provided in the rear surface of the camera and which require a finger to be inserted between the rear surface of the camera and the face of the user who has his or her eye near the eyepiece part during operation, and so on. The controller wheel 106, for example, can be thought of as an operation member which requires a finger to be inserted between the digital camera 100 and the face of the user who has his or her eye near during operation. A zoom lever provided in the periphery of the shutter button 102, for example, can be thought of as a member that is not such an operation member. In this case, if eye non-proximity has been detected while the controller wheel 106 is been rotated, the processes of S504 and S505 are carried out without moving to S507, with the process moving to S507 once the rotation of the controller wheel 106 has ended or a predetermined amount of time has elapsed after a state of eye non-proximity is in effect. On the other hand, if eye non-proximity has been detected, the process moves to S507, without the processes of S503 to S505 being carried out, even if the zoom lever is being operated. The zoom lever is an operation member provided in a surface of the digital camera 100 (e.g., an upper part, or around the lens barrel of the lens on the front surface of the camera) that is different from the surface including the eyepiece part of the EVF 101b (the rear surface). Accordingly, it is unlikely that the user will unintentionally take his or her face away from the eyepiece part due to operating the zoom lever with his or her finger.

Additionally, the example described here is an example of control carried out in accordance with whether or not a touch-on has been made, in which the switching of the display destination is suppressed when a touch-on has been made. However, whether or not to carry out control for suppressing the switching of the display destination may be switched in accordance with the type of the touch operation. For example, if a touch-on state is simply being continued, it may be assumed that AF frame-related operations are not being carried out, and control for suppressing the switching of the display destination is not carried out. If, however, a touch-move operation is being repeated within a predetermined amount of time, it may be assumed that AF frame-related operations (operations for moving the AF frame in touch & drag AF) are underway, and control for suppressing the switching of the display destination may be carried out.

Touch-Down Process

Figure 6A:
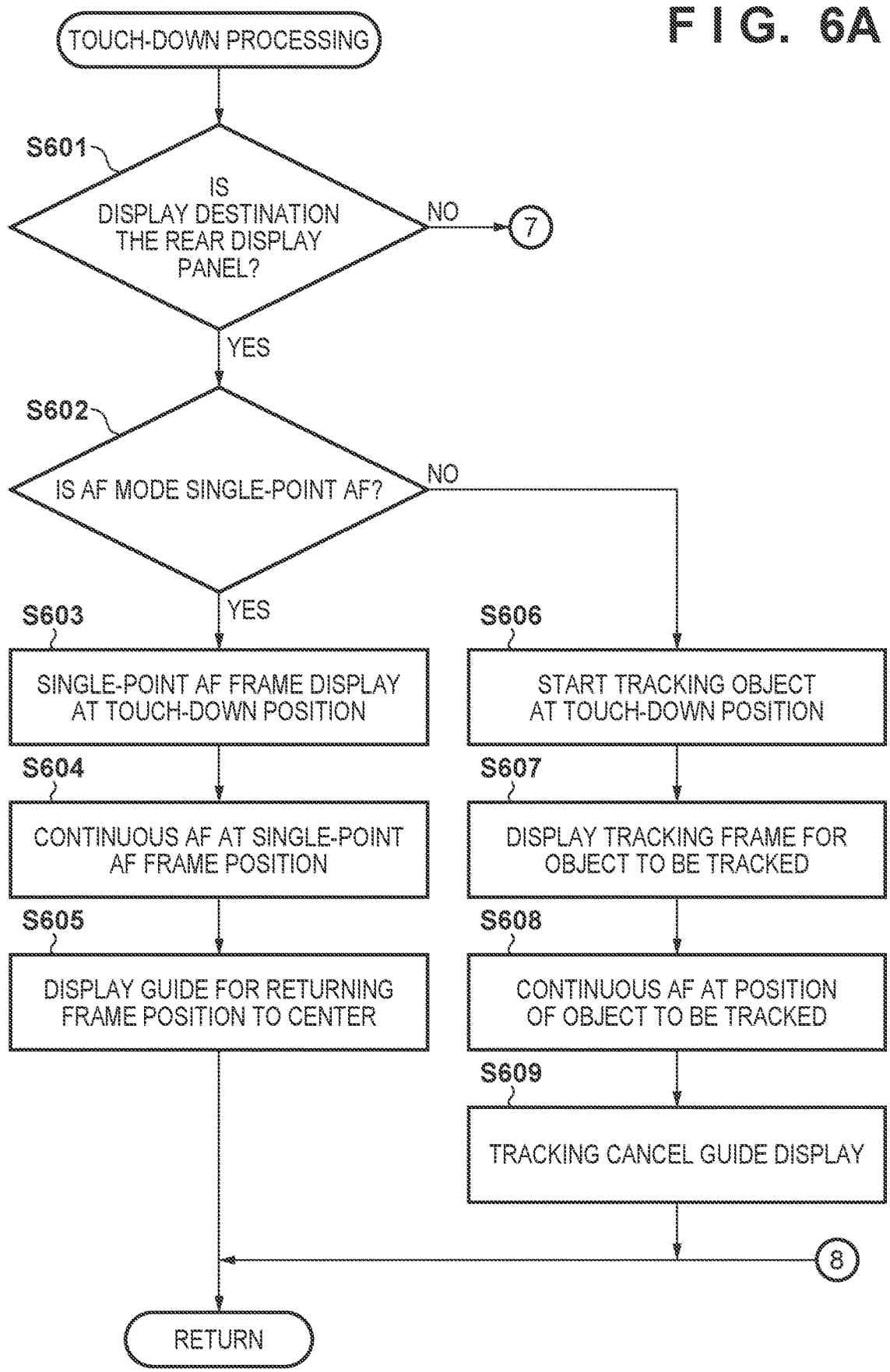
FIG. 6A is a flowchart illustrating a touch-down process.

The touch-down process of S312 in FIG. 3B will be described in detail next using FIGS. 6A to 6C.

In S601, the system control unit 201 determines whether or not the display destination is the rear display panel 101a. The process moves to S602 if the display destination is the rear display panel, and moves to S610 if such is not the case.

In S602, the system control unit 201 refers to the settings information held in the system memory 212, and determines whether or not the AF mode is the single-point AF mode. The process moves to S603 if the AF mode is the single-point AF mode, and moves to S606 if such is not the case (if the AF mode is the tracking mode).

In S603, the system control unit 201 displays the single-point AF frame at coordinates, in the rear display panel 101a, that correspond to a touch-down position on the touch panel 104a.

In S604, the system control unit 201 updates the position where continuous AF is carried out to the current position of the single-point AF frame, and carries out continuous AF.

In S605, the system control unit 201 displays a guide for returning the position of the single-point AF frame to the center in the rear display panel 101a. The guide may be guidance using a character string, or may be an icon. Meanwhile, the operation for returning the position of the single-point AF frame to the center may be an operation of a button included in the operation unit 104, or may be a touch operation made in the touch panel 104a.

In S606, the system control unit 201 tracks an object detected near the coordinates, in the rear display panel 101a, that correspond to the touch-down position on the touch panel 104a. This results in a transition to a currently-tracking state.

In S607, the system control unit 201 displays the tracking frame 1138, in a range indicating the object being tracked, in the LV image displayed in the rear display panel 101a.

In S608, the system control unit 201 updates the position where continuous AF is carried out to the current tracking position, and carries out continuous AF.

In S609, the system control unit 201 displays the tracking cancel guide in the rear display panel 101a. The tracking cancel guide is the same as that described with reference to S512.

In S610, the system control unit 201 refers to the settings information held in the system memory 212 and determines whether or not the above-described touch & drag AF setting is "active". The process moves to S611 if "active" is set, and ends if such is not the case.

In S611, the system control unit 201 refers to the settings information held in the system memory 212, and determines whether or not the above-described AF position designation method is set to absolute position designation. The process moves to S612 if absolute position designation is set, and moves to S620 if such is not the case.

In S612, the system control unit 201 refers to the settings information held in the system memory 212, and determines whether or not the AF mode is the single-point AF mode. The process moves to S613 if the AF mode is single-point AF, and moves to S616 if such is not the case (if the AF mode is the tracking mode).

In S613, the system control unit 201 displays the single-point AF frame at a position, in the EVF 101b, that corresponds to the touch-down position on the touch panel 104a.

In S614, the system control unit 201 updates the position where continuous AF is carried out to the current position of the single-point AF frame, and carries out continuous AF.

In S615, the system control unit 201 displays a guide for returning the position of the single-point AF frame to the center in the EVF 101b.

In S616, the system control unit 201 determines whether or not an object is currently being tracked. The process moves to S618 if an object is currently being tracked, and moves to S617 if such is not the case.

In S617, the system control unit 201 cancels the object tracking and transitions to a tracking-canceled state. The tracking frame 1138 is hidden as a result.

Figure 11E:
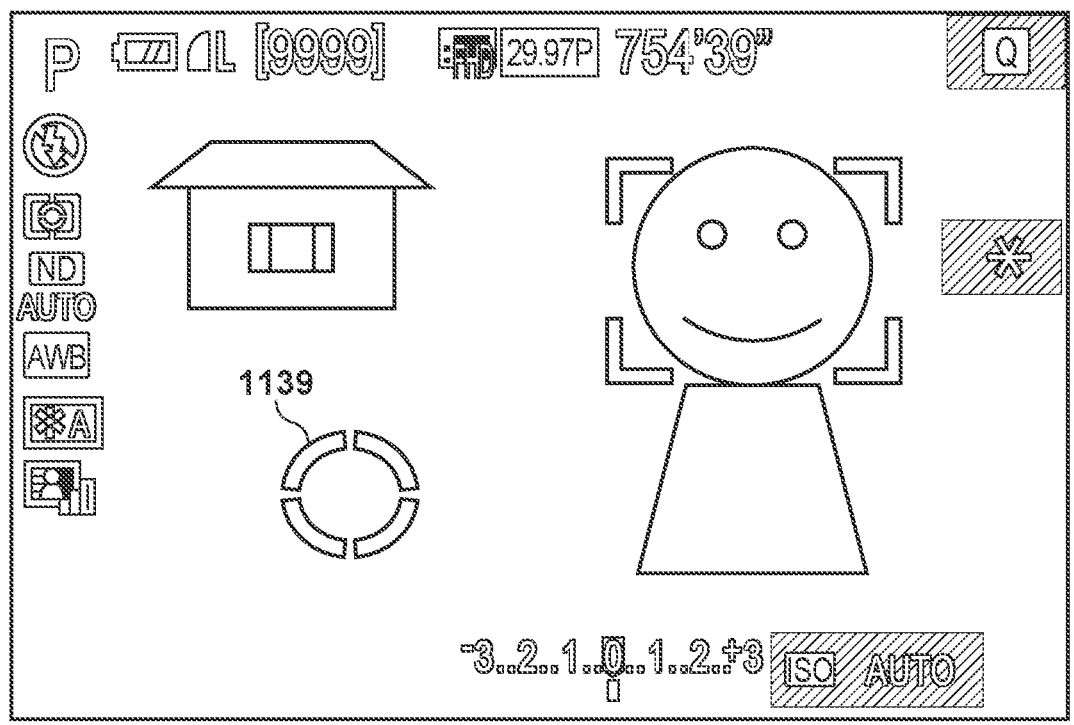
FIG. 11E is a diagram illustrating an example of a display screen in a shooting mode.

In S618, the system control unit 201 displays the designated position indicator at coordinates, in the EVF 101b, that correspond to the touch-down position on the touch panel 104a. In other words, if a touch-down is made while tracking is underway, the tracking is canceled, and the designated position indicator is instead displayed in order to designate a new tracking target. FIG. 11E illustrates an example of the display of the designated position indicator in the EVF 101b. A designated position indicator 1139 is an indicator (cursor) that can be moved in response to a touch-move operation by the user, and indicates the current designated position in the LV image by the touch & drag AF function. The designated position indicator 1139 is displayed when in an eye-proximate state and during the touch operation (during touch-on), and is not displayed when in the eye non-proximate state, when the EVF 101b is hidden, and the touch & drag AF is set to "inactive". Additionally, the designated position indicator 1139 is displayed in the EVF 101b but is not displayed in the rear display panel 101a. The designated position indicator 1139 is displayed in a position uniquely associated with the touch position in the touch panel 104a if absolute position designation is set. Additionally, when relative position designation is not set, the designated position indicator 1139 is moved to the current position, based on the direction and movement amount of the touch-move, regardless of where the touch position is in the touch panel 104a. Note that if a specific object is being detected, the detection frame 1136 is displayed during the display of the designated position indicator 1139 as well.

In S619, the system control unit 201 updates the position where continuous AF is carried out to a position based on the current object detection result, and carries out continuous AR The position where this continuous AF is carried out is not a position based on the designated position indicator 1139, but is instead a position based on the object automatically determined by the digital camera 100 to be the primary object. In other words, the same AF control as that used in a tracking-canceled state is carried out.

In S620, the system control unit 201 refers to the settings information held in the system memory 212, and determines whether or not the AF mode is the single-point AF mode. The process ends if the AF mode is single-point AF, and moves to S621 if such is not the case (if the AF mode is the tracking mode).

In S621, the system control unit 201 determines whether or not an object is currently being tracked. The process moves to S622 if an object is currently being tracked, and moves to S627 if such is not the case.

In S622, the system control unit 201 cancels the object tracking and transitions to a tracking-canceled state. The tracking frame 1138 is hidden as a result. In other words, if a touch-down is made while tracking is underway, the tracking is canceled; instead, a locked-on detection frame is displayed in S624 (described later), or the designated position indicator is displayed in S625, in order to designate a new tracking target.

In S623, the system control unit 201 determines whether or not the tracking position from the time when the tracking was canceled is near a facial (specific object) detection position (whether or not the tracking position from the time when the tracking was canceled is within a predetermined range from the facial (specific object) detection position). In this determination, the position is determined to be near if, when a face (a specific object) is detected, the range of the tracking (a tracking range) from when the tracking was canceled overlaps with at least part of the range of the detected face (the specific object), for example. The position may be determined to be near if, when a face (a specific object) is detected, the center of the range of the tracking (the tracking range) from when the tracking was canceled is within the range of the detected face (the specific object). Furthermore, it may be determined whether or not the object that was being tracked is a face, and a determination of "YES" may be made if the object that was being tracked is a face. The process moves to S624 if it is determined that the tracking position from when the tracking was canceled is near a facial (specific object) detection position, and moves to S625 if such is not the case.

In S624, the system control unit 201 displays a locked-on detection frame 1140 in a range expressing the detected face (specific object) determined in S623 to be near the tracking position when the tracking was canceled.

In S625, the system control unit 201 displays the designated position indicator 1139 at the coordinates, in the EVF 101b, where the tracking frame had been displayed until immediately before the tracking was canceled.

In S626, the system control unit 201 updates the position where continuous AF is carried out to a position based on the current object detection result, regardless of the position of the designated position indicator, and carries out continuous AF, in the same manner as in S619.

In S627, the system control unit 201 determines whether or not the designated position indicator 1139 is currently being displayed in the EVF 101b. If, when relative position designation is set in the tracking mode, an object detected at the position of the designated position indicator 1139 during the touch-up process described later was not locked onto, the designated position indicator 1139 is displayed for a predetermined amount of time after the touch-up as well, without determining the tracking target. This makes it possible to use relative position designation to move the designated position indicator 1139 to a desired position through touch-move operations in which touches have been made over several times in sequence.

In S627, the system control unit 201 determines whether or not the designated position indicator 1139 is currently being displayed. The process moves to S629 if the indicator is currently being displayed, and moves to S628 if such is not the case.

In S628, the system control unit 201 displays the designated position indicator 1139 in the center of the LV image displayed in the EVF 101b. In other words, when, during relative position designation, a touch-down is made while the designated position indicator 1139 is not being displayed, the designated position indicator 1139 is displayed in the default position (the center) regardless of the touch-down position.

Touch-Move Process

Figure 7A:
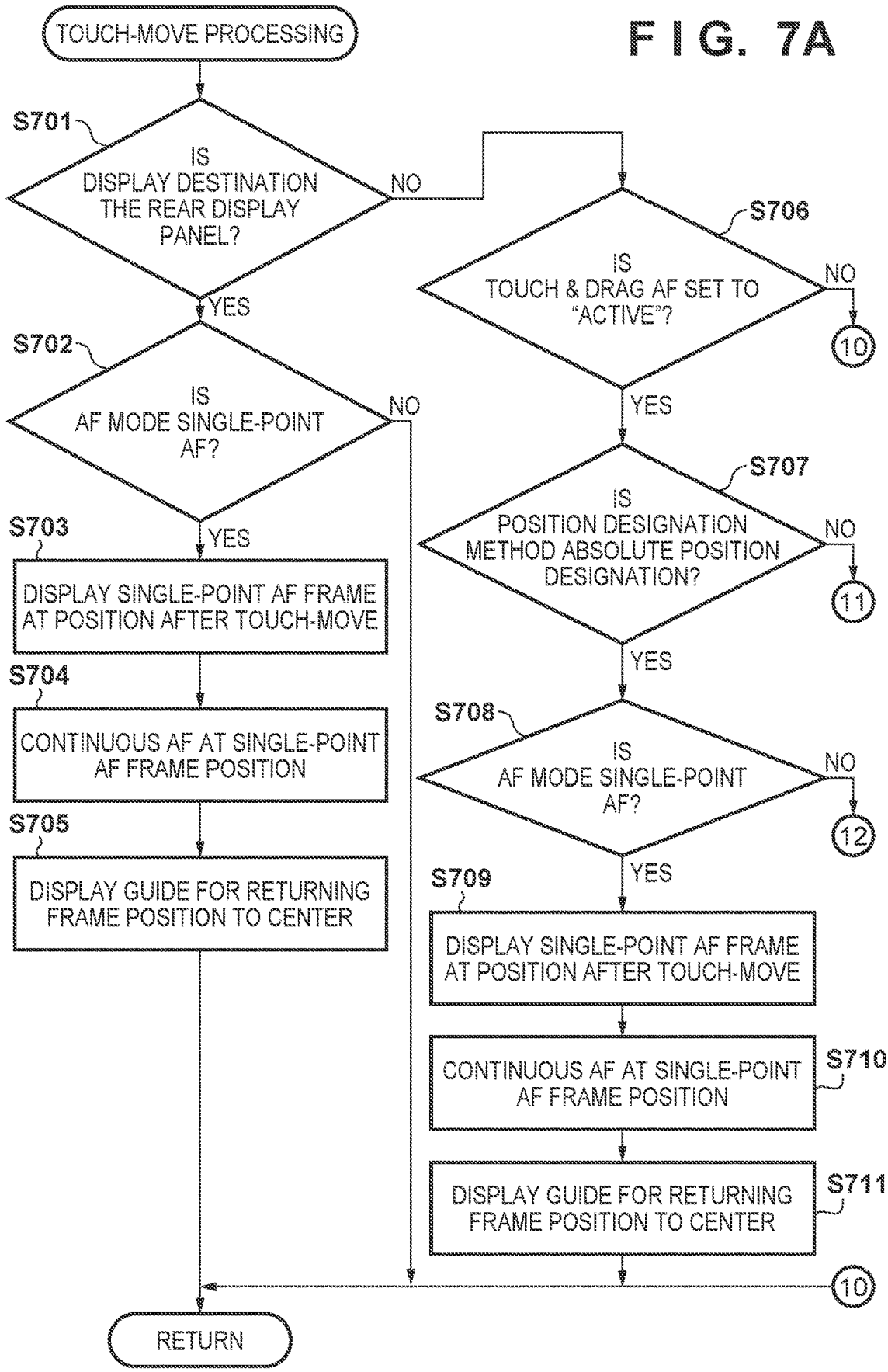
FIG. 7A is a flowchart illustrating a touch-move process.

The touch-move process of S314 in FIG. 3B will be described in detail next using FIGS. 7A and 7B.

In S701, the system control unit 201 determines whether or not the display destination is the rear display panel 101a. The process moves to S702 if the display destination is the rear display panel, and moves to S706 if such is not the case.

In S702, the system control unit 201 refers to the settings information held in the system memory 212, and determines whether or not the AF mode is the single-point AF mode. The process moves to S703 if the AF mode is single-point AF, and ends if such is not the case (if the AF mode is the tracking mode). In other words, if the display destination is the rear display panel 101a and the AF mode is the tracking mode, changes to the tracking target based on the touch-move, AF on the position based on the touch-move, and so on are not carried out. From S606 to S608, the tracking target is determined on the basis of the touch-down position as described earlier, and thus the tracking of the tracking target set on the basis of the touch-down position is continued thereafter even if the touch continues and a touch-move is made.

In S703, the system control unit 201 displays the single-point AF frame at coordinates, in the rear display panel 101a, that correspond to the position in the touch panel 104a after the touch-move.

In S704, the system control unit 201 updates the position where continuous AF is carried out to the current position of the single-point AF frame, and carries out continuous AF.

In S705, the system control unit 201 displays a guide for returning the position of the single-point AF frame to the center in the rear display panel 101a. The guide for returning to the center is the same as that described with reference to S605.

In S706, the system control unit 201 refers to the settings information held in the system memory 212 and determines whether or not the above-described touch & drag AF setting is "active". The process moves to S707 if "active" is set, and ends if "inactive" is set.

In S707, the system control unit 201 refers to the settings information held in the system memory 212, and determines whether or not the above-described AF position designation method is set to absolute position designation. The process moves to S708 if absolute position designation is set, and moves to S715 if such is not the case (if relative position designation is set).

In S708, the system control unit 201 refers to the settings information held in the system memory 212, and determines whether or not the AF mode is the single-point AF mode. The process moves to S709 if the AF mode is single-point AF, and moves to S712 if such is not the case.

In S709, the system control unit 201 displays the single-point AF frame at coordinates, in the EVF 101b, that correspond to the position in the touch panel 104a after the touch-move.

In S710, the system control unit 201 updates the position where continuous AF is carried out to the current position of the single-point AF frame, and carries out continuous AF.

In S711, the system control unit 201 displays a guide for returning the position of the single-point AF frame to the center in the EVF 101b. The guide for returning to the center is the same as that described with reference to S605.

In S712, the system control unit 201 determines whether or not the coordinates in the EVF 101b corresponding to the touch position following the touch-move in the touch panel 104a (the designated position in the LV image) are near the detected object. In other words, it is determined whether or not the designated position in the LV image is within a predetermined range from the position of the detected object. The position is determined to be near if, when a face (a specific object) has been detected, the coordinates in the EVF 101b corresponding to the touch position after the touch-move are within the detection frame 1136 (a facial detection frame) that is being displayed. Meanwhile, the position is determined not to be near if, when a face (a specific object) has been detected, the coordinates in the EVF 101b corresponding to the touch position after the touch-move are outside the detection frame 1136 (the facial detection frame) that is being displayed. The position is determined not to be near if a face (a specific object) is not detected. The determination as to whether the position is near is not limited thereto. For example, the position may be determined to be near if, when a face (a specific object) has been detected, the coordinates in the EVF 101b corresponding to the touch position after the touch-move are within a range a predetermined multiple (e.g., 1.5 times) the detection frame 1136 (the facial detection frame) that is being displayed. Additionally, the position may be determined to be near if, when a face (a specific object) has been detected, a range indicated by the designated position indicator 1139 moved by the touch-move is in a position that at least partially overlaps with the range of the detection frame 1136 (the facial detection frame) that is being displayed. The process moves to S713 if the position is near, and moves to S714 if such is not the case.

Figure 11F:
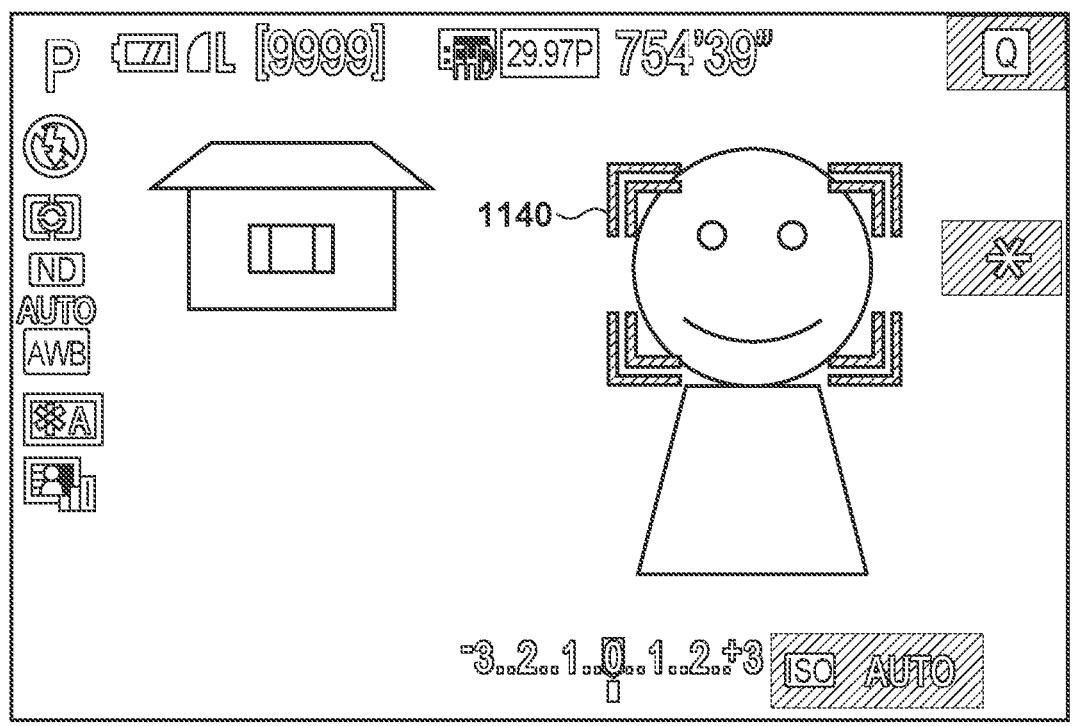
FIG. 11F is a diagram illustrating an example of a display screen in a shooting mode.

In S713, the system control unit 201 hides the detection frame 1136 and the designated position indicator 1139 displayed in the EVF 101b, and displays a locked-on detection frame 1140. FIG. 11F illustrates an example of the display of the locked-on detection frame 1140. The locked-on detection frame 1140 is displayed superimposed over the LV image, and when a touch-up is made in the state, the object surrounded by the locked-on detection frame 1140 is indicated as the target of tracking. The locked-on detection frame 1140 indicates the target attracting in response to a touch-up, and is thus displayed having the same shape as the tracking frame 1138, but is displayed with a different color from the tracking frame 1138 so as to be distinguishable from the tracking frame 1138. The display format of the locked-on detection frame 1140 is not limited to this example, and may be any format making it possible to identify the tracking is not being carried out but is started in response to a touch-up. For example, another format may be used, such as displaying a trackable icon or a trackable guide while the designated position indicator 1139 remains displayed, changing only the color of the designated position indicator 1139, or the like.

In S714, the system control unit 201 displays the designated position indicator 1139 at coordinates, in the EVF 101b, that correspond to the touch position, after the touch-move, on the touch panel 104a.

In S715, the system control unit 201 refers to the settings information held in the system memory 212, and determines whether or not the AF mode is the single-point AF mode. The process moves to S716 if the AF mode is single-point AF, and moves to S719 if such is not the case (if the AF mode is the tracking mode).

In S716, the system control unit 201 displays the single-point AF frame at coordinates, in the EVF 101b, that correspond to a position based on the movement direction and movement amount of the touch-move operation made on the touch panel 104a. Because relative position designation is set, this position is not a position uniquely corresponding to the touch position.

In S717, the system control unit 201 updates the position where continuous AF is carried out to the current position of the single-point AF frame, and carries out continuous AF.

In S718, the system control unit 201 displays a guide for returning the position of the single-point AF frame to the center in the EVF 101b. The guide for returning to the center is the same as that described with reference to S605.

In S719, the system control unit 201 determines whether or not the coordinates in the EVF 101b corresponding to the position based on the movement direction and movement amount of the touch-move operation made on the touch panel 104a (the designated position in the LV image) are near the detected object. Although this determination is similar to the determination made in the above-described S712, absolute position designation is set, and thus the subject for comparison with the detection frame 1136 (the facial detection frame) is a position designated through the relative position designation rather than a position uniquely corresponding to the touch position following the touch-move. The process moves to S720 if the position is near, and moves to S721 if such is not the case.

In S720, the system control unit 201 hides the detection frame 1136 and the designated position indicator 1139 displayed in the EVF 101b, and displays the locked-on detection frame 1140, in the same manner as in S713.

In S721, the system control unit 201 displays the designated position indicator 1139 at coordinates, in the EVF 101b, that correspond to a designated position based on the movement direction and movement amount of the touch-move operation on the touch panel 104a (an indicator display position change process). In this state, continuous AF is carried out at a position based on the current object detection result, rather than at the position indicated by the designated position indicator 1139. Note that in this state, the AF operations may be stopped (with AF not being carried out).

Touch-Up Process

The touch-up process of S316 in FIG. 3B will be described in detail next using FIGS. 8A and 8B.

In S801, the system control unit 201 determines whether or not the display destination is the rear display panel 101a. The process ends if the display destination is the rear display panel, and moves to S802 if such is not the case.

In S802, the system control unit 201 refers to the settings information held in the system memory 212 and determines whether or not the above-described touch & drag AF setting is "active". The process moves to S803 if "active" is set, and ends if such is not the case.

In S803, the system control unit 201 refers to the settings information held in the system memory 212, and determines whether or not the above-described AF position designation method is set to absolute position designation. The process moves to S804 if absolute position designation is set, and moves to S809 if such is not the case.

In S804, the system control unit 201 refers to the settings information held in the system memory 212, and determines whether or not the AF mode is the single-point AF mode. The process ends if the AF mode is the single-point AF mode, and moves to S805 if such is not the case (if the AF mode is the tracking mode).

In S805, the system control unit 201 begins tracking an object detected as being near the designated position on the basis of coordinates (the designated position), in the EVF 101b, corresponding to the touch-up position on the touch panel 104a (that is, enters a state of tracking).

In S806, the system control unit 201 displays the tracking frame 1138, in a range indicating the object being tracked, in the LV image displayed in the EVF 101b.

In S807, the system control unit 201 updates the position where continuous AF is carried out to the current tracking position, and carries out continuous AF.

In S808, the system control unit 201 displays the tracking cancel guide in the rear display panel 101a. The tracking cancel guide is the same as that described with reference to S512.

In S809, the system control unit 201 refers to the settings information held in the system memory 212, and determines whether or not the AF mode is the single-point AF mode. The process ends if the AF mode is the single-point AF mode, and moves to S810 if such is not the case (if the AF mode is the tracking mode).

In S810, the system control unit 201 determines whether or not the locked-on detection frame 1140 is being displayed in the EVF 101b. The process moves to S813 if the frame is being displayed, and moves to S811 if such is not the case.

In S811, the system control unit 201 determines whether or not an operation for suspending tracking determination standby has been made in the operation unit 104. The operation for suspending tracking determination standby is, for example, an instruction to display another screen (menu screen) made in response to a new touch-down, a menu button included in the operation unit 104 being pressed, or the like. The process ends if the operation for suspending has been made, and moves to S812 if such is not the case. Note that if a new touch-down has been made, is again determined in S311 of FIG. 3B that a touch-down has been made, and it is determined, in S627 of FIG. 6C, that a touch-down has been made while the designated position indicator 1139 is being displayed.

In S812, the system control unit 201 determines whether or not a predetermined amount of time has elapsed after the detection of the touch-up. The predetermined amount of time may be any amount of time sufficient for a new touch to be carried out in a continuous series of touch operations through which the user continues to move the designated position indicator 1139, and is approximately one second, for example. The process moves to S813 if the predetermined amount of time has elapsed, and returns to S811 if such is not the case.

In S813, the system control unit 201 begins tracking an object detected near the designated position indicator 1139 on the basis of the position of the designated position indicator 1139 displayed in the EVF 101b (enters a state of tracking).

The processing from S814 to S816 is the same as the processing from S806 to S808, and thus descriptions thereof will be omitted.

As described above, if the AF mode is the tracking mode and the position designation method is relative position designation, when the designated position indicator 1139 is moved to a desired position in the LV image using the touch & drag AF function, the object to be tracked is determined once a predetermined amount of time has elapsed following a touch-up.

This format is used in order to prevent a problem in which, for example, AF is started midway through moving the AF position from one object to another object in the tracking mode, resulting in the background being focused on so that the object to be tracked becomes blurry and cannot be detected.

Additionally, when the position designation method is relative position designation, it is conceivable that the user will make multiple touch-move operations in order to move the designated position indicator to a desired object, and thus starting the tracking of the object immediately after a touch-up results in poor operability. On the other hand, if the user must additionally instruct the tracking to start immediately after a touch-up, the operational burden increases, which is not a desirable situation. The format described with reference to S721 in FIG. 7B, S811 and S812 in FIG. 8B, and so on is used to address such an issue.

Additionally, if the designated position indicator has already reached the detected object (if the locked-on detection frame is displayed), it is assumed that the user has successfully moved the designated position indicator to the desired object, and thus the object to be tracked is determined immediately, without waiting for the predetermined amount of time to elapse before the determination. As a result, even if the object to be tracked as moving, it is easy to designate that object as a target for tracking.

Touch Cancel Process

Figure 9B:
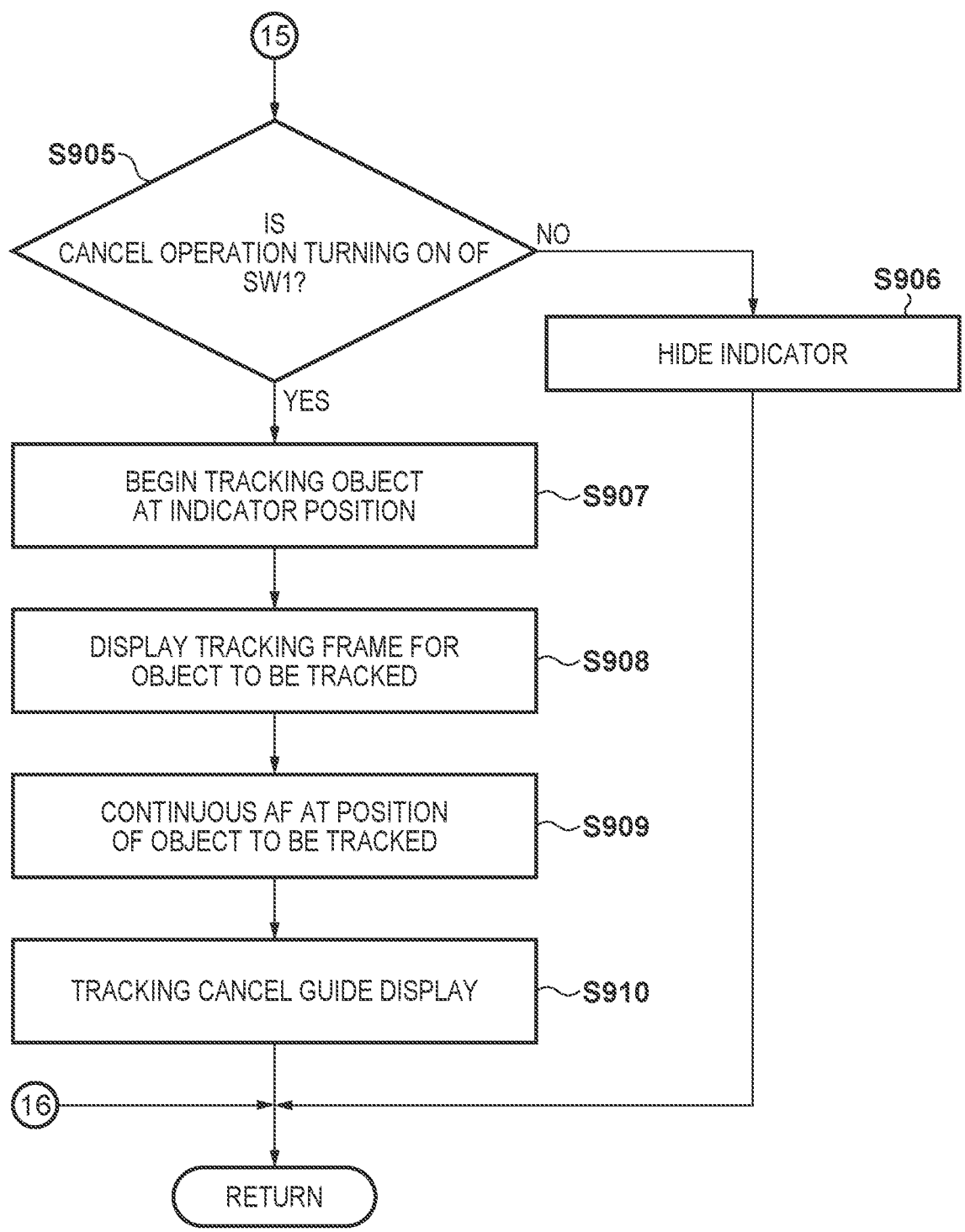
FIG. 9B is a flowchart illustrating the touch cancel process.

The touch cancel process of S318 in FIG. 3B will be described in detail next using FIGS. 9A and 9B.

In S901, the system control unit 201 determines whether or not the display destination is the rear display panel 101a. The process moves to S911 if the display destination is the rear display panel, and moves to S902 if such is not the case.

In S902, the system control unit 201 refers to the settings information held in the system memory 212 and determines whether or not the above-described touch & drag AF setting is "active". The process moves to S903 if "active" is set, and moves to S911 if such is not the case.

In S903, the system control unit 201 refers to the settings information held in the system memory 212, and determines whether or not the AF mode is the single-point AF mode. The process moves to S911 if the AF mode is the single-point AF mode, and moves to S904 if such is not the case.

In S904, the system control unit 201 determines whether or not the designated position indicator 1139 is currently being displayed in the EVF 101b. The process moves to S905 if the indicator is currently being displayed, and moves to S911 if such is not the case.

In S905, the system control unit 201 determines whether or not the touch cancel operation was the first shutter switch 102a turning on (SW1 on) in response to the shutter button 102 being pressed halfway. The process moves to S906 if a SW1 is on, and moves to S907 if such is not the case.

In S906, the system control unit 201 hides the designated position indicator 1139. In S907, the system control unit 201 begins tracking an object detected near the designated position indicator 1139 on the basis of the position of the designated position indicator 1139 displayed in the EVF 101b (enters a state of tracking). This processing is the same as S813 in FIG. 8B. In other words, if, when the touch cancel operation has been made, a shooting preparation instruction was made as a result of SW1 turning on, the tracking target is determined on the basis of the position of the designated position indicator 1139 at that point in time, even if the panel is still being touched. The tracking is then started, and the shooting preparation process is carried out at the tracking position. This makes it possible to quickly shoot an image, with the desired object in focus through AF, at the point in time when the designated position indicator 1139 has reached the position of the desired object, even if a touch-up is not made. If a member aside from the first shutter switch 102a has been operated while the panel is still being touched, the touch operation is canceled while remaining in a tracking-canceled state, without the tracking target being determined.

Figure 8A:
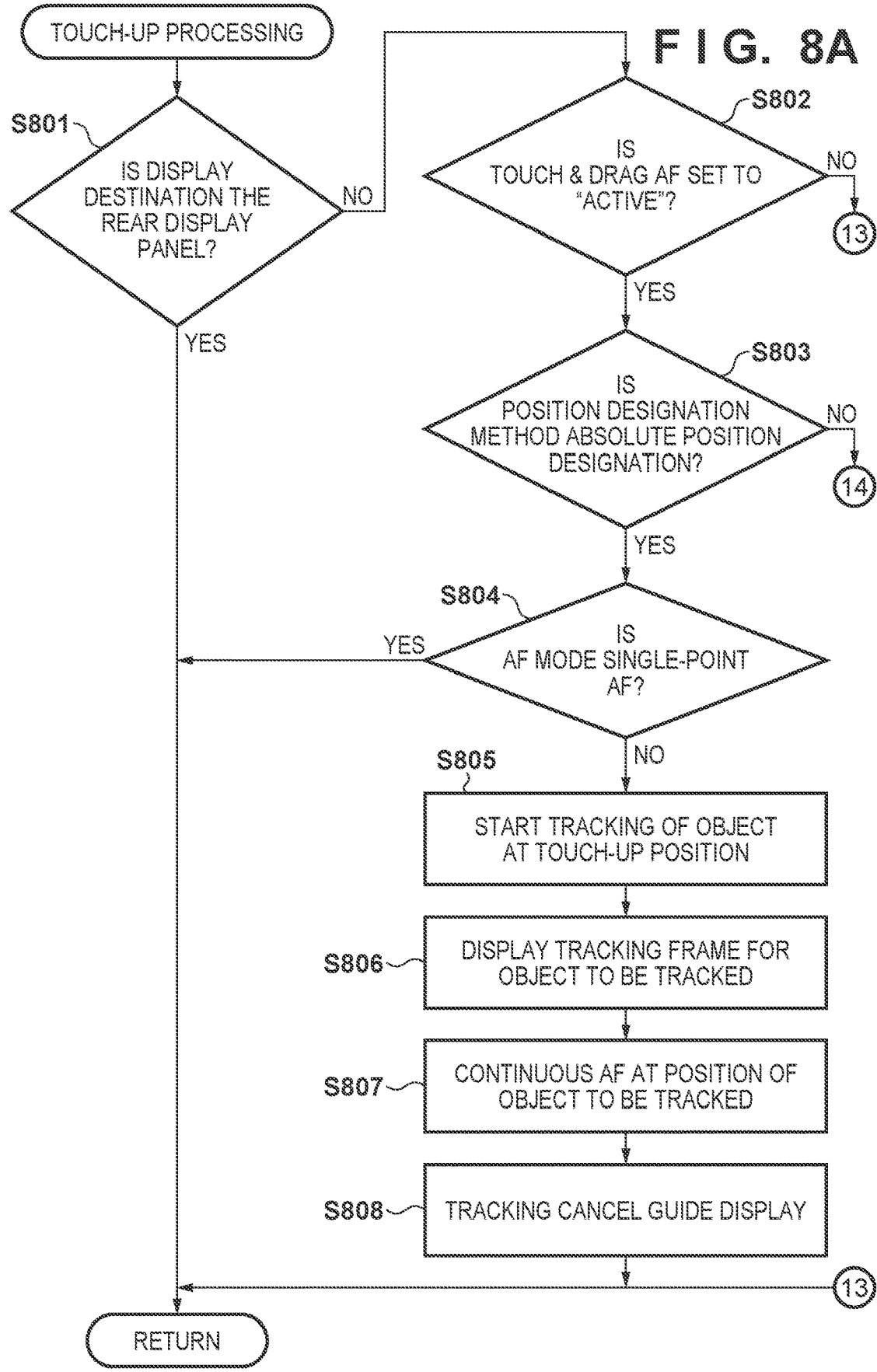
FIG. 8A is a flowchart illustrating a touch-up process.
Figure 8B:
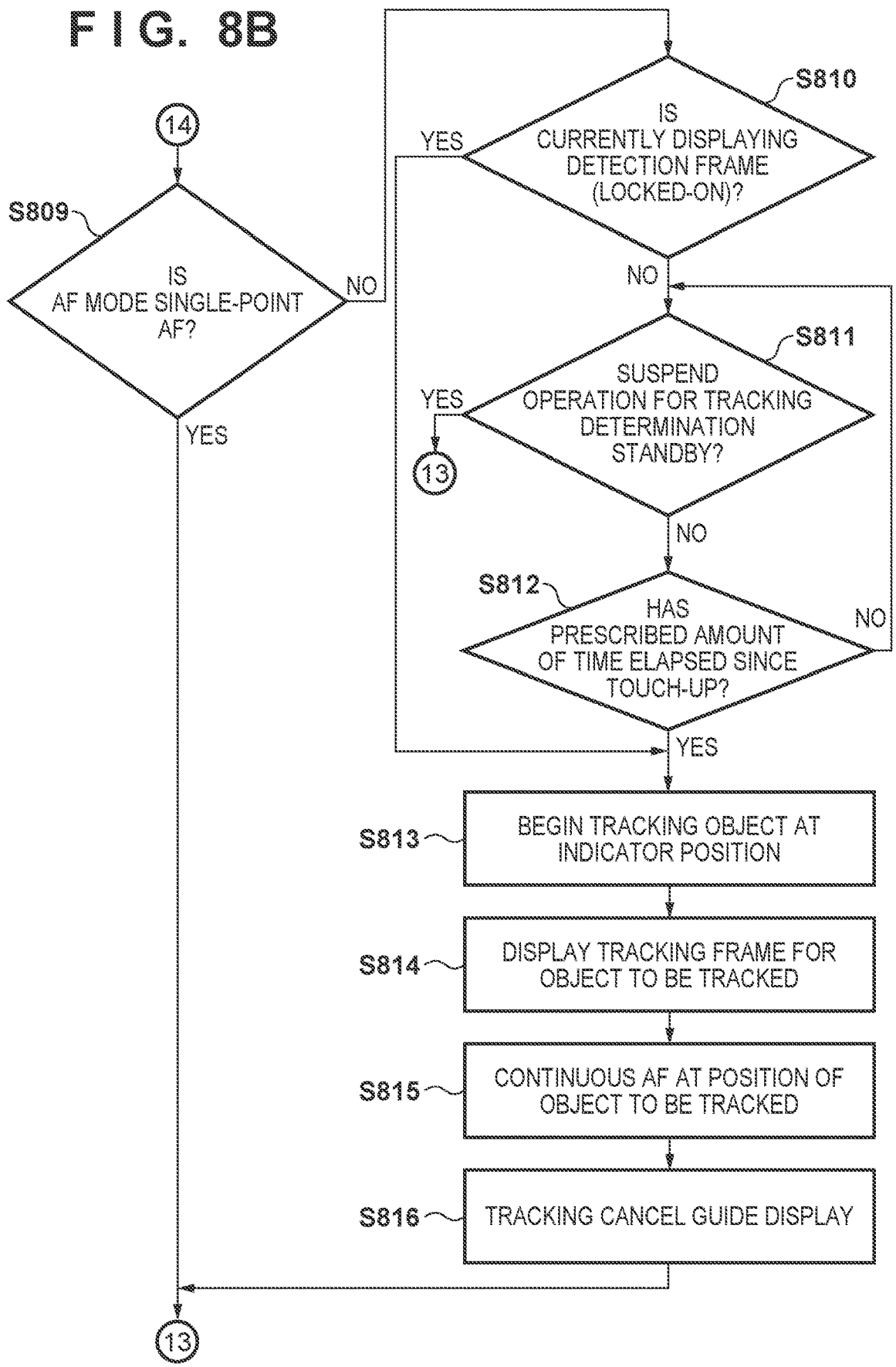
FIG. 8B is a flowchart illustrating the touch-up process.

The processing from S908 to S909 is the same as the processing from S806 to S808 in FIG. 8A, and thus descriptions thereof will be omitted. In S911, the system control unit 201 carries out the touch-up process illustrated in FIGS. 8A and 8B.

Note that the operation for suspending the tracking determination standby in S811, described with reference to FIG. 8B, and the operation for starting the tracking even midway through a touch operation, corresponding to YES in S905, are not limited to the above-described examples. Another operation member included in the operation unit 104 may be operated, or the tracking determination standby may be suspended, the tracking may be started, or the like in response to the display destination being switched between the rear display panel 101a and the EVF 101b in accordance with the user's eye proximity or non-proximity.

Frame Button Process

The frame button process carried out in S320 of FIG. 3C will be described in detail next using FIG. 10.

In S1001, the system control unit 201 refers to the settings information held in the system memory 212, and determines whether or not the AF mode is the single-point AF mode. The process moves to S1002 if the AF mode is single-point AF, and moves to S1005 if such is not the case (if the AF mode is the tracking mode).

In S1002, the system control unit 201 determines whether or not the frame button included in the operation unit 104 has been held down (pressed continuously for greater than or equal to a predetermined amount of time). The process moves to S1004 if the button has been held down, and moves to S1003 if such is not the case.

In S1003, the system control unit 201 transitions to the frame movement mode, in which the position of the single-point AF frame can be changed. In this mode, the single-point AF frame can be moved by operating the up, down, left, and right buttons included in the operation unit 104, the controller wheel 106, or the like, in addition to the operations made to the touch panel 104a described thus far. The LV image can also be enlarged at a desired position.

In S1004, the system control unit 201 returns the position of the single-point AF frame to the center. In S1005, the system control unit 201 determines whether or not the display destination is the rear display panel 101a. The process moves to S1006 if the display destination is the rear display panel, and moves to S1007 if such is not the case.

In S1006, the system control unit 201 transitions to a face selection mode. The facial selection mode is a function for tracking the object, among the currently-detected objects, that is most appropriate as a primary face.

In S1007, the system control unit 201 refers to the settings information held in the system memory 212, and determines whether or not the above-described AF position designation method is set to absolute position designation. The process moves to S1008 if absolute position designation is set, and moves to S1006 if such is not the case.

In S1008, the system control unit 201 determines whether or not an object is currently being tracked. The process moves to S1009 if an object is currently being tracked, and moves to S1006 if such is not the case.

In S1009, the system control unit 201 cancels the object tracking and transitions to a tracking-canceled state. The tracking frame 1138 is hidden as a result.

Figure 6B:
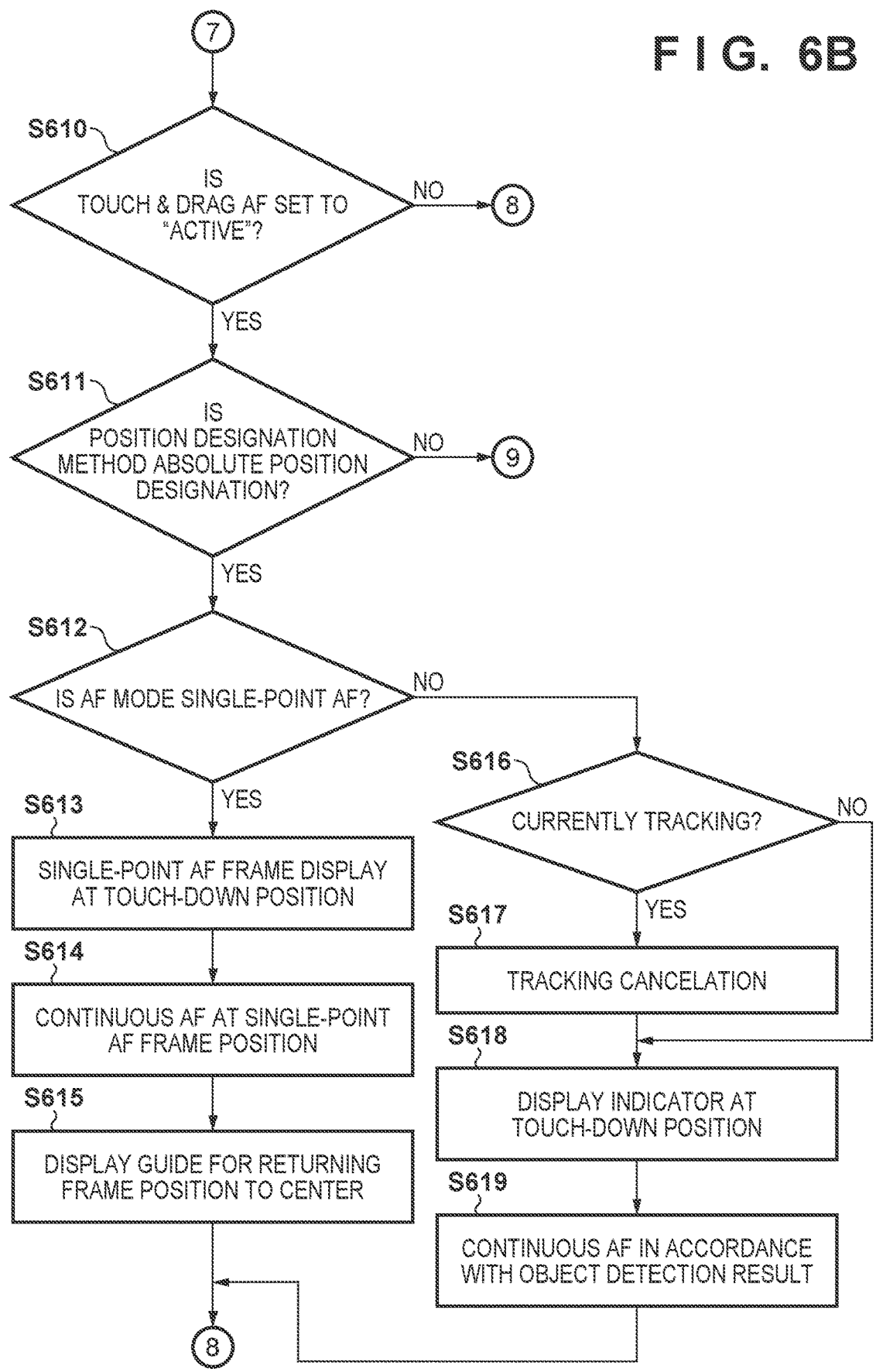
FIG. 6B is a flowchart illustrating the touch-down process.

In S1010, the system control unit 201 updates the position where continuous AF is carried out to a position based on the current object detection result, and carries out continuous AF, in the same manner as S619 in FIG. 6B.

Although the descriptions given thus far have use the EVF 101b as an example, the present invention can also be applied in an image capturing apparatus including an optical viewfinder instead of the EVF 101b. In this case, the following items are replaced and employed. The eye proximity detection unit 219 detects eye proximity with respect to an eyepiece part of the optical viewfinder. In the eye-proximate state, the rear display panel 101a is turned off, and the driving of a liquid crystal display element or the like, which is provided in the optical viewfinder and is used to display information, is started. Note that the display element in the optical viewfinder may carry out a display in the eye non-proximate state. The LV image need not be displayed in the rear display panel 101a during the eye non-proximate state; instead, information aside from the LV image may be displayed, or the display may be turned off. However, it is assumed that the touch panel 104a is driven if the touch & drag AF is set to "active". In the eye-proximate state, the LV image is not displayed in the optical viewfinder, and an optical image can be seen instead. The tracking frame, the designated position indicator, and the locked-on detection frame, which have been described as being displayed in the eye-proximate state, are displayed by a predetermined plurality of display elements in the optical viewfinder, overlapping with the optical image. The detection frame may or may not be displayed.

With respect to the format of the frame described thus far, the size may be variable in accordance with the circumstances, and the frame need not be constituted by a single frame. For example, if a plurality of AF points are displayed in a display unit in advance, as with an optical viewfinder or the like, a touch position may be indicated by, for example, changing the color of the plurality of AF points in accordance with the position and surface area of the finger that made the touch.

Additionally, the length of the standby time until tracking is determined in S811 may be made variable by the user, or may be changed automatically in accordance with the shooting scene. For example, when a moving object can be detected from the LV image, and the situation is one in which a moving object is detected, the tracking target may be determined immediately in response to a touch-up even if the locked-on detection frame is not currently being displayed. Alternatively, in a situation where it is determined, from output from the attitude detection unit 218 or analysis of time-base correlation of the LV image, that the digital camera 100 itself is moving, the tracking target may be determined immediately in response to a touch-up even if the locked-on detection frame is not currently being displayed. This is because in such situations, it is conceivable that the user wishes to track the moving object in the LV image. Additionally, if the shooting mode for shooting an object with a high amount of movement is set, the tracking target may be determined immediately in response to a touch-up even if the locked-on detection frame is not currently being displayed. Of the plurality of scene-specific shooting modes, the sports shooting mode (described above), a fireworks mode, a pet (animal) shooting mode, and a child (kids) shooting mode can be given as examples of shooting modes for shooting an object with a high amount of movement. The portrait shooting mode, the flower shooting mode, a food shooting mode, an auction item shooting mode, and a landscape shooting mode can be given as examples of shooting modes not for shooting an object with a high amount of movement (shooting modes for shooting an object with a low amount of movement).

Conversely, if an undesired object is mistakenly tracked when shooting a moving image (when recording a moving image) and the undesired object is focused on, the state in which the undesired object is focused on will also be recorded, which is an undesirable situation. Thus to reliably prevent an unintended object from being focused on while shooting a moving image (while recording a moving image), the tracking may be determined following a predetermined amount of time after a touch-up, even in the case where the designated position indicator has been moved to the object detection position. In this case, different amounts of time may be provided in accordance with whether or not the position of the designated position indicator is the object detection position, and the time weighted before determination may be reduced for situations where the position of the designated position indicator is the object detection position.

Although the expression "near" is used with respect to the tracking determination time, the time for locking onto the designated position indicator detection frame, and so on, thresholds for how "near" an item must be for carrying out each process may be made variable by the user, or may be automatically changed in accordance with the shooting scene. For example, in scenes where a moving object is shot, and in shooting modes for shooting a moving object, it may be assumed that the moving object will be difficult to follow, and thus a determination of "near" may be made even if the designated position indicator is further from the object than normal.

Example of Screen Displayed by Touch & Drag AF Function

An example of operations carried out when, using the touch & drag AF function, the user makes a touch-move to switch from tracking the position of a flower in the right side of the LV image to tracking a person in the left side of the LV image will be described next using FIGS. 13A-13C, 13D1 and 13D2, 13E1 and 13E2, and 13F1 and F2.

Figure 13A:
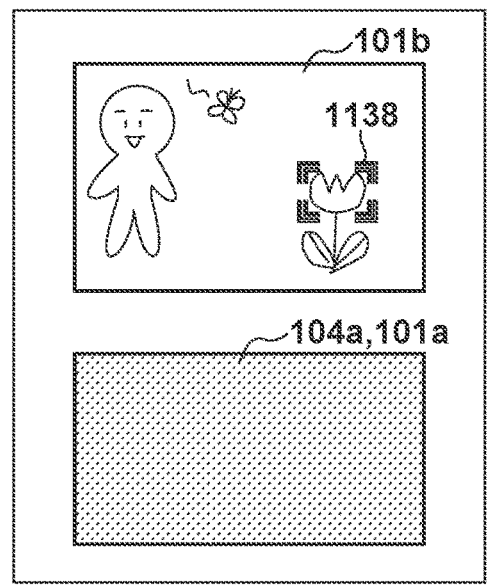
FIG. 13A is a diagram illustrating an example of a screen display provided by a touch & drag AF function.

FIGS. 13A to 13C, 13D2, 13E2, and 13F2 illustrate examples of operations according to the present embodiment. FIGS. 13D1, 13E1, and 13F1 illustrate examples of operations in a case where the present embodiment is not applied, and are comparisons for illustrating the effects of the present embodiment. FIGS. 13A-13C, 13D1-13D2, 13E1-13E2, and 13F1-13F2 assume the following:

touch & drag AF: "active"
position designation method: relative position designation
touch response region: entire surface
eye proximity/eye non-proximity: eye-proximate state FIG. 13A illustrates an example in which tracking is underway while no touch is being made (touch-off). A flower, which is an object in part of the LV image, is being tracked, and the tracking frame 1138 is displayed in the EVF 101b for the flower in the LV image. No finger is touching the touch panel 104a.

Figure 13B:
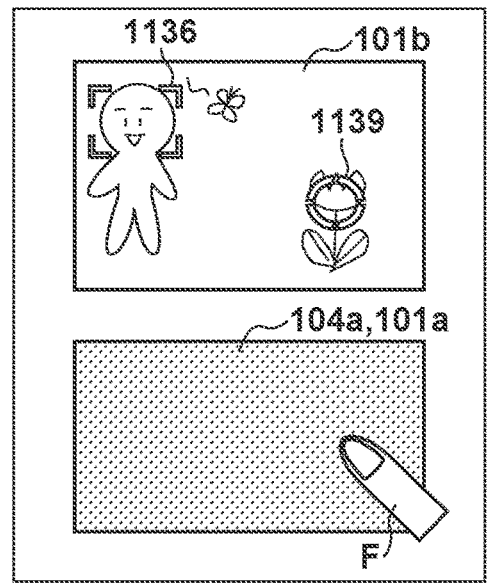
FIG. 13B is a diagram illustrating an example of a screen display provided by the touch & drag AF function.

FIG. 13B illustrates an example of a case where a touch-down has been made in the state illustrated in FIG. 13A. The tracking of the flower is canceled, and the designated position indicator 1139 is displayed instead. The face of a person is detected by the object detection, and thus the detection frame 1136 is displayed in the EVF 101b for the person's face in the LV image. A finger F is touching the touch panel 104a.

Figure 13C:
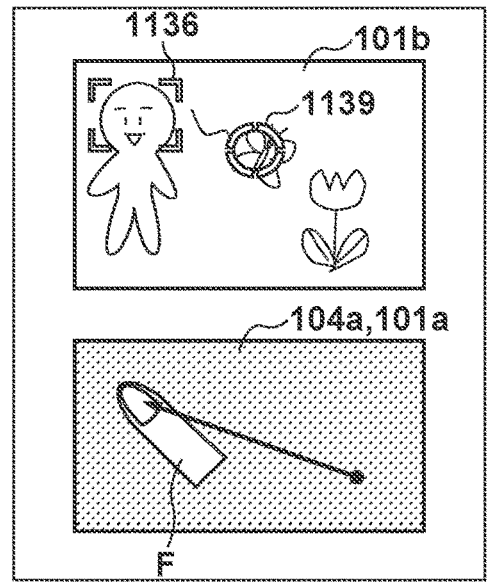
FIG. 13C is a diagram illustrating an example of a screen display provided by the touch & drag AF function.

FIG. 13C illustrates an example of a case where a touch-move has been made in the state illustrated in FIG. 13B, so that the finger F moves to the upper-left. The designated position indicator 1139 moves to the upper-left in accordance with the touch-move. In this example, that position coincides with a butterfly, which is an object that happened to be moving at that time. The finger F has moved close to the left end of the touch panel 104a, and thus it is difficult for the user to make a touch-move further to the left. However, the designated position indicator 1139 has not yet reached the desired position corresponding to the person, and thus the user makes a touch-up, makes another touch-down on the right side, and then attempts a touch-move to the left.

FIG. 13D1 illustrates an example of a case where a touch-up is made in the state illustrated in FIG. 13C, and the tracking target is determined without carrying out the tracking determination standby described in the present embodiment (S811, S812). The butterfly, which was at the position of the designated position indicator 1139 at the point in time when the touch-up was made, is immediately determined for tracking; the tracking frame 1138 is displayed for the butterfly, which is not the desired object of the user, and the tracking is started.

FIG. 13E1 illustrates an example of a case where the butterfly has moved from the state illustrated in FIG. 13D1 before the user has made the second touch-down. The butterfly is being tracked, and thus the tracking frame 1138 moves near the flower on the right side along with the butterfly.

FIG. 13F1 illustrates an example of a case where the user makes another touch-down in the state illustrated in FIG. 13E1 and then makes a touch-move from the right side to the left side (the second touch-move). The designated position indicator 1139 moves from the position of the tracking frame 1138, which tracked the butterfly and moved to the right against the wishes of the user (FIG. 13E1), and thus the designated position indicator 1139 cannot move to the desired position corresponding to the person even if the second touch-move is made. Accordingly, if the tracking determination standby described in the present embodiment (S811, S812) is not carried out, there are cases where an unintended object is tracked, which interferes with the user's operations for designating the AF position (the tracking position designation operations).

An example of a case where the tracking determination standby described in the present embodiment (S811, S812) is carried out will be described using FIGS. 13D2, 13E2, and 13F2.

FIG. 13D2 illustrates an example of a state where a touch-up is made in the state illustrated in FIG. 13C, and the tracking determination standby described in the present embodiment (S811, S812) is carried out. Because the locked-on detection frame was not being displayed at the point in time illustrated in FIG. 13C (immediately before the touch-up), a determination of "NO" is made in S810, and the tracking determination process of S813 is not carried out immediately.

FIG. 13E2 illustrates an example of a case where the butterfly has moved from the state illustrated in FIG. 13D2 before the user has made the second touch-down, and thus the state of the objects is the same as in the case illustrated in FIG. 13E1. If the operation for suspending the tracking determination standby is not carried out in S811, and the predetermined amount of time has not elapsed following the touch-up in S812, the butterfly will not be tracked. Thus although the butterfly is moving to the right, the designated position indicator 1139 does not move following the point in time when the touch-up was made.

FIG. 13F2 illustrates an example of a case where the user makes another touch-down in the state illustrated in FIG. 13E2 and then makes a touch-move from the right side to the left side (the second touch-move). The movement of the designated position indicator 1139 is resumed from the position where the indicator was displayed at the point in time of the previous touch-up (FIG. 13D2), and therefore successfully moves to the desired position, corresponding to the person, in response to the second touch-move. As a result, the designated position indicator 1139 locks onto the detection frame 1136 of the desired person, and the locked-on detection frame 1140 is displayed. If a touch-up is made at this point in time, the tracking of the desired person will start without waiting for the predetermined amount of time, and the person can therefore be tracked reliably even if the person moves. In this manner, the intended object can be designated for tracking more reliably, and with better operability, by carrying out the tracking determination standby described in the present embodiment (S811, S812). Note that if, in the state illustrated in FIG. 13C, the object the user wishes to track is the butterfly, pressing the shutter button 102 halfway at this point in time makes it possible to carry out the touch cancel process of S907 illustrated in FIG. 9B and track the butterfly instead. In other words, according to the present embodiment, an object to be tracked can be designated for tracking without standing by for tracking determination (without losing the object) even if the detection frame 1136 is not displayed in the object is moving.

An example of operations carried out when, using the touch & drag AF function, the user attempts a touch-move to switch from tracking a person in the right side of the LV image to tracking a person in the left side of the LV image will be described next using FIGS. 14A and 14B, 14C1 and 14C2, 14D1 and 14D2, 14E1 and 14E2, and 14F.

FIGS. 14A, 14B, 14C2, 14D2, and 14E2 illustrate examples of operations according to the present embodiment. FIGS. 14C1, 14D1, 14E1, and 14F illustrate examples of operations in a case where the present embodiment is not applied, and are comparisons for illustrating the effects of the present embodiment.

Figure 14A:
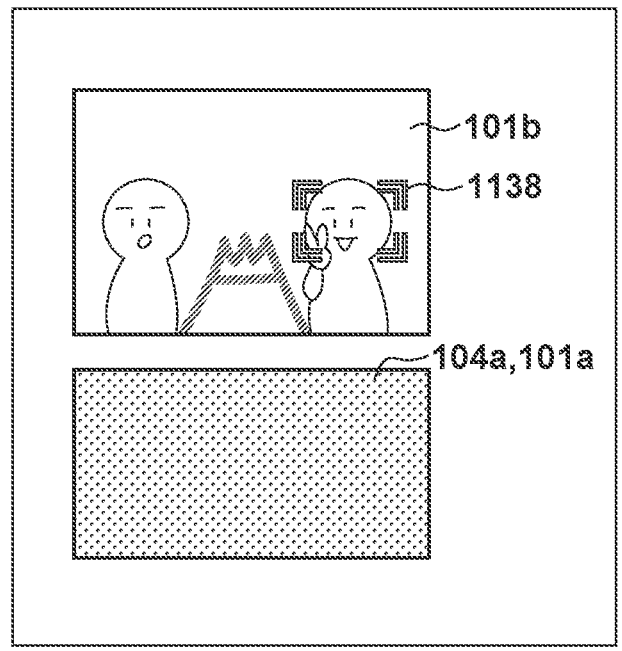
FIG. 14A is a diagram illustrating an example of a screen display provided by a touch & drag AF function.

FIGS. 14A and 14B, 14C1 and 14C2, 14D1 and 14D2, 14E1 and 14E2, and 14F assume the following:
touch & drag AF: "active"
position designation method: absolute position designation
touch response region: entire surface
eye proximity/eye non-proximity:eye-proximate state FIG. 14A illustrates an example in which tracking is underway while no touch is being made (touch-off). Two people are present in the LV image, one on the right side and one on the left, and the person on the right side is being tracked. The tracking frame 1138 is displayed for the person on the right side of the LV image in the EVF 101b. A mountain is also visible far in the distance beyond the person on the right side and the person on the left side. No finger is touching the touch panel 104a.

Figure 14B:
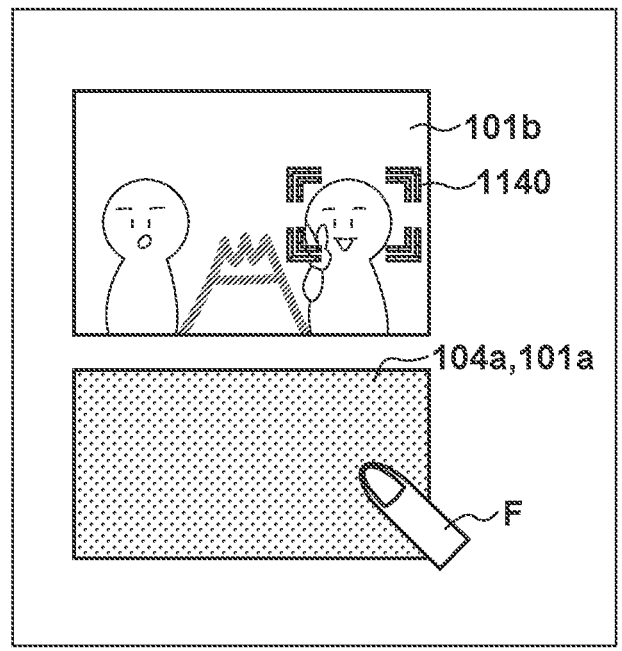
FIG. 14B is a diagram illustrating an example of a screen display provided by the touch & drag AF function.

FIG. 14B illustrates an example of a case where a touch-down has been made in the state illustrated in FIG. 14A. The tracking for the person on the right side is canceled, and instead, the locked-on detection frame 1140 is displayed for the face of the person on the right side, which has been detected at a position corresponding to the touch position. The finger F is touching the right side of the touch panel 104a.

FIGS. 14C1, 14D1, 14E1, and 14F illustrate examples of operations when continuous AF is carried out at the position of the designated position indicator 1139, unlike S626 and S627 illustrated in FIG. 6C.

FIG. 14C1 illustrates an example where a touch-move is underway, in which the finger F is being moved toward the person on the left side from the state illustrated in FIG. 14B. The designated position indicator 1139 moves to the left in accordance with the touch-move, and is positioned over the mountain. In this example, continuous AF is being carried out at the position of the designated position indicator 1139, which results in AF being carried out so that the mountain is in focus but the two people in the foreground are blurry.

Because the two people in the foreground are blurry, faces cannot be detected from the LV image, and the detection frame 1136 is not displayed. At this time, it is possible that the people will be so blurry that even the user cannot recognize them as people. In such a case, the user will lose sight of the person on the left side, who is the desired person, and will no longer know which way to continue the touch-move, making it difficult to designate the tracking target. Additionally, regardless of whether or not the designated position indicator 1139 is positioned at the object which the user wishes to focus on, the state of focus will fluctuate rapidly in accordance with the position of the designated position indicator 1139, which makes the LV image difficult to view.

FIG. 14D1 illustrates an example of operations carried out immediately after a touch-move is made further to the left from the state in FIG. 14C1, and the designated position indicator 1139 has moved to the position of the desired person, who is on the left side. Although continuous AF is carried out at the designated position indicator 1139, the person on the left side was blurry in FIG. 14C1, resulting in a slight pause until the person on the left side comes into focus; as such, the face of the person on the left side is not being detected. Accordingly, the locked-on detection frame 1140 is not displayed despite the designated position indicator 1139 having reached the position of the desired person who is on the left side. There is thus a risk that the user will mistakenly think that the desired person who is on the left side cannot be designated for tracking.

FIG. 14E1 illustrates an example where a touch-up has been made from the state illustrated in FIG. 14D1. Because the touch-up was made in a state where the locked-on detection frame 1140 was not displayed, the tracking determination standby (S811, S812) is carried out, and thus the person on the left side is not immediately determined as the tracking target. If the person on the left side has moved during the tracking determination standby, the person on the left side can no longer be designated for tracking, even if the position of the person on the left side was successfully designated at the point in time when the touch-up was made.

FIG. 14F illustrates an example in which the tracking determination standby (S811, S812) has elapsed following the state illustrated in FIG. 14E1, and the tracking has started for the desired person on the left side. Thus in FIGS. 14C1, 14D1, 14E1, and 14F, in which the present embodiment is not applied, it is difficult to carry out operations for moving the tracking position to the desired object (the person on the left side). There are also cases where the desired object (the person on the left side) is not in focus when the designated position indicator 1139 is moved to the desired object (the person on the left side). In this case, if a shot is to be taken immediately, the timing at which the shot is taken will be delayed by the amount of time required to bring the shot into focus using the shooting preparation operations. In other words, there is a risk that the user will miss a shooting opportunity.

On the other hand, an example in which AF is not carried out on the basis of the position of the designated position indicator 1139 while the designated position indicator 1139 is being displayed, as described in the present embodiment, will be given using FIGS. 14C2, 14D2, and 14E2.

FIG. 14C2 illustrates an example where a touch-move is underway, in which the finger F is being moved toward the person on the left side from the state illustrated in FIG. 14B. The designated position indicator 1139 moves to the left in accordance with the touch-move, and is positioned over the mountain. In the present embodiment, in this state, the continuous AF is not carried out at the position of the designated position indicator 1139 (S626, S629, S721). Accordingly, the two people in the foreground are in focus, their faces are detected, and the detection frames 1136 are displayed at the positions of those faces. As such, the user may simply continue the touch-move toward the detection frame 1136 of the person on the left side, which makes it easy to move the AF position to the desired object (that is, change the tracking target). Furthermore, regardless of the position of the designated position indicator 1139, the state of focus does not fluctuate significantly, and thus the LV image does not become difficult to view.

FIG. 14D2 illustrates an example of operations carried out immediately after a touch-move is made further to the left from the state in FIG. 14C2, and the designated position indicator 1139 has moved to the position of the desired person, who is on the left side. Because the designated position indicator 1139 is near the detection frame 1136 on the left side, the locked-on detection frame 1140 is displayed locked-on to the detection frame for the person on the left side.

FIG. 14E2 illustrates an example where a touch-up has been made from the state illustrated in FIG. 14D2. Because a touch-up has been made in a state where the locked-on detection frame 1140 is displayed, the person on the left side is immediately determined as the tracking target, and tracking is started, without carrying out the tracking determination standby (S811, S812). Accordingly, the person on the left side can be tracked reliably even in the case where the person left side has moved after the touch-up. Additionally, because the desired object (the person on the left side) is in focus when the designated position indicator 1139 is moved to the desired object (the person on the left side), if the shot is to be taken immediately, the shot is brought into focus and taken immediately. In other words, the shot can be taken without missing the shooting opportunity.

Note that the above-described various types of control performed by the system control unit 201 may be carried out by a single piece of hardware, or the control of the apparatus as a whole may be carried out by dividing the processing up among multiple pieces of hardware.

Although the foregoing has described a preferred embodiment of the present invention, the present invention is not intended to be limited to the specific embodiment, and all variations that do not depart from the essential spirit of the invention are intended to be included in the scope of the present invention. Furthermore, the above-described embodiment is merely one embodiment of the present invention, and different embodiments can be combined as appropriate.

The foregoing embodiment describes an example of a case where the present invention is applied in a digital camera having a touch & drag AF function in which an AF frame is designated by making a touch operation while viewing an EVF. However, the present invention is not limited to this example. The present invention can be applied in any apparatus having a function in which a shot can be taken while moving an AF frame through a touch operation. Regarding the process for switching the display destination, described with reference to FIGS. 5A and 5B, the present invention can be applied in any display control apparatus that controls the display of an eyepiece viewfinder, even if the apparatus does not have an image capturing function. In other words, the present invention can be applied in personal computers and PDAs, mobile telephone terminals and portable image viewers, digital photo frames, music players, game devices, e-book readers, tablet terminals, smartphones, and the like. The present invention can also be applied in projection apparatuses, as well as household apparatuses, vehicle-mounted apparatuses, medical devices, and so on including displays. The present invention can also be applied in image capture control apparatuses such as mobile phones, smartphones (which are a type of mobile phone), tablet terminals, and so on that connects to an image capturing apparatus using hard-wired or wireless communication means and control the image capturing apparatus through remote operations.

According to the present invention, the burden of operations when selecting a tracking target through a touch operation can be reduced, and the convenience can be improved.

Furthermore, according to the present invention, AF can be more appropriately controlled when selecting a tracking target through a touch operation, and the convenience can be improved.

Further still, according to the present invention, a touch operation being carried out while looking through a viewfinder can be continued even if a user mistakenly removes his or her eye from the viewfinder midway through the operation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capture control apparatus comprising:
   a touch detector configured to be capable of detecting a touch operation; and
   a memory and at least one processor and/or at least one circuit to perform operations of the following units:

a tracking unit configured to track a tracking target in a live view image captured by an image capturing unit;

an AF mode setting unit configured to be capable of setting one of a plurality of AF modes, each AF mode having a different method for determining an AF position; and a control unit configured to carry out control so that in the case where a first AF mode, which determines an AF position without tracking carried out by the tracking unit, is set by the AF mode setting unit, AF is executed on the basis of a position based on movement of a touch position while a touch is detected by the touch detector, and in the case where a second AF mode, which can determine the AF position through tracking carried out by the tracking unit, is set by the AF mode setting unit, AF based on a position based on the movement of the touch position is not executed while a touch is detected by the touch detector.

2. The image capture control apparatus according to claim 1, wherein in the case where the second AF mode is set, the control unit carries out control so that when the touch detector detects that a touch has released and the tracking target is determined on the basis of movement of the touch position, AF based on the position of the determined tracking target is executed.

3. The image capture control apparatus according to claim 1, wherein the processor and/or the circuit performs operation of:

an object detection unit configured to detect a specific object from the live view image, wherein the control unit carries out control so that, in the case where the second AF mode is set, AF is executed at the position of the object detected by the object detection unit while a touch is detected by the touch detector, regardless of movement of the touch position.

4. The image capture control apparatus according to claim 1, further comprising:

an eyepiece viewfinder;

a first display that can be viewed through the eyepiece viewfinder; and a second display, disposed outside the eyepiece viewfinder, including a display surface that serves as a touch operation detection surface of the touch detector, wherein in the case where the first display is set as the display destination and the first AF mode is set by the AF mode setting unit, the control unit carries out control so that while a touch is detected by the touch detector, AF is executed on the basis of a position based on the movement of the touch position; and in the case where the first display is set as the display destination and the second AF mode is set by the AF mode setting unit, the control unit carries out control so that while a touch is detected by the touch detector, AF is not executed on the basis of a position based on the movement of the touch position.

5. The image capture control apparatus according to claim 4, further comprising:

an eye proximity detector configured to detect eye proximity with the eyepiece viewfinder, wherein the processor and/or the circuit performs operation of:

a switching unit configured to switch the display destination to the first display in the case where eye proximity is detected by the eye proximity detector, and switching the display destination to the second display in the case where eye proximity is not detected by the eye proximity detector.

6. The image capture control apparatus according to claim 4, wherein the control unit carries out control so that in the case where the second display is the display destination and the second AF mode is set by the AF mode setting unit, the tracking target is determined on the basis of a position where the touch detector has detected the start of a touch, AF based on the position of the determined tracking target is executed, and AF based on a position based on the movement of the touch position is not executed while a touch is detected by the touch detector.

7. The image capture control apparatus according to claim 3, wherein the processor and/or the circuit performs operation of:

a display control unit configured to carry out control so that a detection indicator indicating the position of the object detected by the object detection unit is displayed in a display, wherein in the case where the second AF mode is set, the display control unit carries out control so that the detection indicator is displayed even while a touch is detected by the touch detector.

8. The image capture control apparatus according to claim 7, wherein in the case where the second AF mode is set, the display control unit furthermore carries out control so that while the touch detector detects the touch, a designated position indicator is displayed at a position based on the movement of the touch position in the display.

9. The image capture control apparatus according to claim 7, wherein the display control unit carries out control so that in the case where the second AF mode is set, when a position based on the movement of the touch position in the display is within a predetermined range from the object detected by the object detection unit while a touch is detected by the touch detector, a display format of the detection indicator changes from a first display format to a second display format.

10. The image capture control apparatus according to claim 9, wherein the display control unit carries out control so that in the case where the second AF mode is set, when the detection indicator is displayed in the second display format while a touch is detected by the touch detector, the designated position indicator displayed at the position based on the movement of the touch position in the display is hidden.

11. The image capture control apparatus according to claim 1, wherein the control unit carries out control so that in the case where the first AF mode is set, AF is executed continuously on the basis of the position based on the movement of the touch position.

12. The image capture control apparatus according to claim 1, wherein the processor and/or the circuit performs operation of:

a tracking unit configured to track a tracking target in a live view image captured by an image capturing unit, wherein in the first AF mode, an AF position is determined without tracking carried out by the tracking unit, and in the second AF mode, the AF position is determined through tracking carried out by the tracking unit.

13. A method of controlling an image capture control apparatus including a touch detector capable of detecting a touch operation, the method comprising:
tracking a tracking target in a live view image captured by an image capturing unit;
setting one of a plurality of AF modes, each AF mode having a different method for determining an AF position; and
carrying out control so that in the case where a first AF mode, which determines an AF position without tracking carried out in the tracking step, is set in the AF mode setting step, AF is executed on the basis of a position based on movement of a touch position while a touch is detected by the touch detector, and in the case where a second AF mode, which can determine the AF position through tracking carried out in the tracking step, is set in the AF mode setting step, AF based on a position based on the movement of the touch position is not executed while a touch is detected by the touch detector.

14. A non-transitory computer-readable storage medium storing a program that causes a computer to function as a tracking unit, an AF mode setting unit and a control unit of an image capture control apparatus having a touch detector configured to be capable of detecting a touch operation,
wherein the tracking unit tracks a tracking target in a live view image captured by an image capturing unit;
the AF mode setting unit is configured to be capable of setting one of a plurality of AF modes, each AF mode having a different method for determining an AF position; and
the control unit is configured to carry out control so that in the case where a first AF mode, which determines an AF position without tracking carried out by the tracking unit, is set by the AF mode setting unit, AF is executed on the basis of a position based on movement of a touch position while a touch is detected by the touch detector, and in the case where a second AF mode, which can determine the AF position through tracking carried out by the tracking unit, is set by the AF mode setting unit, AF based on a position based on the movement of the touch position is not executed while a touch is detected by the touch detector.

15. An image capture control apparatus comprising:
a touch detector configured to be capable of detecting a touch operation; and
a memory and at least one processor and/or at least one circuit to perform operations of the following units:
an AF mode setting unit configured to be capable of setting one of a plurality of AF modes including a first AF mode, in which AF is executed on the basis of a position based on movement of a touch position while a touch is detected by the touch detector, and a second AF mode, in which AF based on a position based on the movement of the touch position is not executed while a touch is detected by the touch detector; and
a control unit configured to carry out AF control based on the AF modes set by the AF mode setting unit.

16. The image capture control apparatus according to claim 15, wherein
in the case where the second AF mode is set, the control unit carries out control so that when the touch detector detects that a touch has released and the tracking target is determined on the basis of movement of the touch position, AF based on the position of the determined tracking target is executed.

17. The image capture control apparatus according to claim 15, wherein the processor and/or the circuit performs operation of:
an object detection unit configured to detect a specific object from the live view image,
wherein the control unit carries out control so that, in the case where the second AF mode is set, AF is executed at the position of the object detected by the object detection unit while a touch is detected by the touch detector, regardless of movement of the touch position.

18. The image capture control apparatus according to claim 15, further comprising:
an eyepiece viewfinder;
a first display that can be viewed through the eyepiece viewfinder; and
a second display, disposed outside the eyepiece viewfinder, including a display surface that serves as a touch operation detection surface of the touch detector,
wherein in the case where the first display is set as the display destination and the first AF mode is set by the AF mode setting unit, the control unit carries out control so that while a touch is detected by the touch detector, AF is executed on the basis of a position based on the movement of the touch position; and
in the case where the first display is set as the display destination and the second AF mode is set by the AF mode setting unit, the control unit carries out control so that while a touch is detected by the touch detector, AF is not executed on the basis of a position based on the movement of the touch position.

19. A method of controlling an image capture control apparatus including a touch detector configured to be capable of detecting a touch operation, the method comprising:
setting one of a plurality of AF modes including a first AF mode, in which AF is executed on the basis of a position based on movement of a touch position while a touch is detected by the touch detector, and a second AF mode, in which AF based on a position based on the movement of the touch position is not executed while a touch is detected by the touch detector; and
carrying out AF control based on the AF modes set by the AF mode setting unit.

20. A non-transitory computer-readable storage medium storing a program that causes a computer to function as an AF mode setting unit and a control unit of an image capture control apparatus having a touch detector configured to be capable of detecting a touch operation,
wherein the AF mode setting unit is configured to be capable of setting one of a plurality of AF modes including a first AF mode, in which AF is executed on the basis of a position based on movement of a touch position while a touch is detected by the touch detector, and a second AF mode, in which AF based on a position based on the movement of the touch position is not executed while a touch is detected by the touch detector; and
the control unit is configured to carry out AF control based on the AF modes set by the AF mode setting unit.

* * * * *